United States Patent [19]
Harada

[11] Patent Number: 5,593,011
[45] Date of Patent: Jan. 14, 1997

[54] SHIFT LOCK UNIT

[75] Inventor: Shoichi Harada, Aichi-ken, Japan

[73] Assignee: Kabushiki Kaisha Tokai-Rika-Denki-Seisakusho, Aichi-ken, Japan

[21] Appl. No.: 453,986

[22] Filed: May 30, 1995

[30] Foreign Application Priority Data

May 31, 1994 [JP] Japan .................... 6-118538

[51] Int. Cl.$^6$ .................... B60K 41/26; B60K 20/02
[52] U.S. Cl. .................... 192/4 A; 74/475; 74/483 R
[58] Field of Search .................... 192/4 R, 4 A, 192/4 C; 74/473 R, 475, 483 R, 483 PB, 483 K; 180/271

[56] References Cited

U.S. PATENT DOCUMENTS

| | | | |
|---|---|---|---|
| 5,003,799 | 4/1991 | Imai et al. | 192/4 A X |
| 5,025,901 | 6/1991 | Kito et al. | 192/4 A |
| 5,257,551 | 11/1993 | Iwata | 74/475 |
| 5,456,133 | 10/1995 | Sogo et al. | 192/4 A X |

FOREIGN PATENT DOCUMENTS 6-80040  3/1994  Japan.

Primary Examiner—Richard M. Lorence
Attorney, Agent, or Firm—Sixbey Friedman Leedom & Ferguson; Thomas W. Cole

[57] ABSTRACT

A compact shift lock unit is provided having a detecting switch and a solenoid operated stopper driver that drives a stopper that engages with and separates from a shift lock plate. When the detecting switch detects a P position, power input connector pins of the stopper driver are positioned in a row with signal output connector pins of the detecting switch. The signal output connector pins and the power input connector pins are interconnected by a single female-type connector at wiring between the stopper driver as well as the detecting switch. A shift lock controller operates and controls the stopper driver so that the stopper separates from the shift lock plate and allows it to move due to the movement of a grooved pin when a shift lever is in a P position and a brake pedal is depressed.

14 Claims, 19 Drawing Sheets

F I G. 7
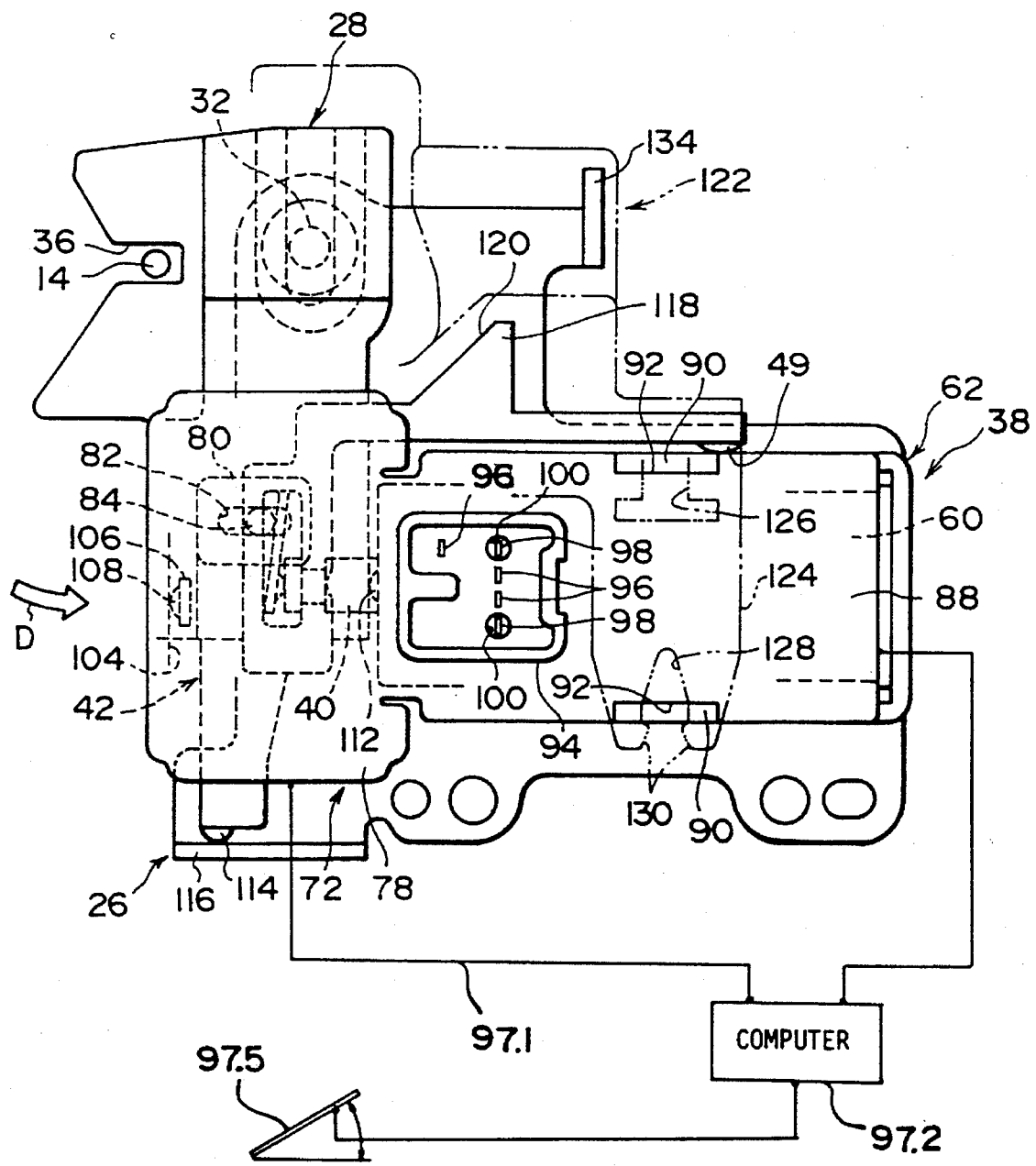

F I G. 13
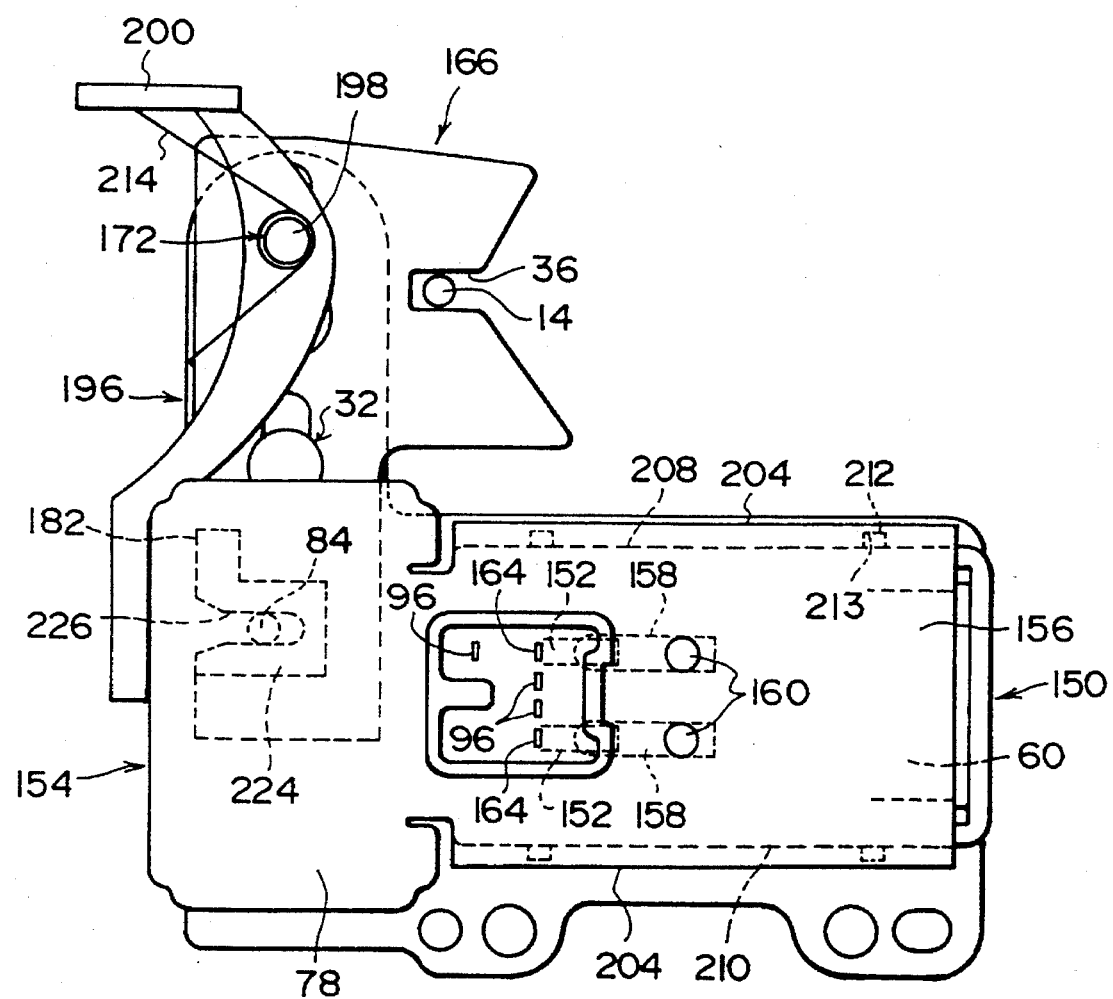

SHIFT LOCK UNIT

BACKGROUND OF THE INVENTION

1. Field of the Invention

The present invention relates to a shift lock unit which is utilized to prevent misoperation of a shift lever or an automatic transmission o an automobile.

2. Description of the Related Art

In a conventional shift lever device of an automatic transmission of an automobile, as illustrated in FIG. 17, a shift lever 300 is pivoted in the direction of arrow A around a pivot shaft 302 provided at the bottom end of the shift lever 300. The position at which a grooved pin 304, which pivots together with the shift lever 300, engages with a detent groove 307 of a detent plate 306 is thereby changed, so that a P position, an R position, an N position, a D position and the like can successively be obtained. In order to shift from the P position, at which the shift lever 300 is vertical, to another position, it is necessary to push a shift lever knob button 308 and move the grooved pin 304 downward in the axial direction of the shift lever (i.e., in the direction of arrow B) so that the grooved pin 304 crosses over a convex portion 310 at the detent groove 307 of the detent plate 306.

Here, in order to prevent misoperation of the shift lever 300, a shift lock unit which prevents shifting from the P position to another position is provided. Due to this unit, if the shift lever knob button 308 is pushed when the brake is not depressed, the grooved pin 304 is not moved downward in the axial direction of the shift lever.

In a conventional shift lock unit, as illustrated in FIGS. 18 and 19, a metal bracket 316 is formed so as to be bent into a horizontal portion 312 and a vertical portion 314. A shift lock plate 318 is disposed so as to oppose the vertical portion 314 of the bracket 316. Two guide holes 320 are provided at the shift lock plate 318, one guide hole 320 being provided at the top of the shift lock plate 318 and the other being provided at the bottom thereof. The guide holes 320 are formed so as to be elongated in the vertical direction. Two guide pins 322, which are formed at the top and bottom of the vertical portion 314 so as to correspond to the guide holes 320, are fixed to the vertical portion 314 so as to protrude therefrom, and engage with the respective guide holes 320. As the grooved pin 304, which engages with an engagement concave portion 324 at the upper end portion of the shift lock plate 318, moves downward in the axial direction of the shift lever, the shift lock plate 318 is guided so as to move in the same direction.

A stopper 326 is disposed to oppose the horizontal portion 312. A stopper shaft 328 is provided at an intermediate portion of the stopper 326. By pivoting the stopper 326 around the stopper shaft 328, an engaged state and a separated state can be obtained. In the engaged state, a lock portion 327 at one end portion of the stopper 326 enters into the lower end surface of the shift lock plate 318 and engages with the shift lock plate 318. In the separated state, the lock portion 327 exits from the lower end surface of the shift lock plate 318 and separates from the shift lock plate 318. In the engaged state, downward movement of the shift lock plate 318 is not possible, movement of the grooved pin 304 downward in the axial direction of the shift lever is prevented, and shifting from the P position to another position is not possible. In the separated state, downward movement of the shift lock plate 318 is possible, and movement of the grooved pin 304 downward in the axial direction of the shift lever is permitted. After the grooved pin 304 is moved downward in the axial direction of the shift lever, by pivoting the shift lever 300, the grooved pin 304 separates from the engagement concave portion 324 of the shift lock plate 318, crosses over the convex portion 310 of the detent groove 307 of the detent plate 306, and movement to another position is possible.

A solenoid 330 (stopper driving means) is mounted to the horizontal portion 312. A fitting hole 334 is formed at the tip end portion of a plunger 332 (moved/driven shaft) of the solenoid 330. An operation pin 336 which protrudes from the other end portion of the stopper 326 fits in the fitting hole 334. When the solenoid 330 is operated, the plunger 332 is pulled in, and the stopper 326 pivots from the engaged state of being engaged with the shift lock plate 318 to the separated state.

A shift lock control switch 338 (detecting switch) is mounted to the vertical portion 314. The shift lock control switch 338 accommodates a contact holder 342 within a switch cover 340, and is closed by a circuit plate 344 having fixed contacts (unillustrated) at the inner surface thereof. The contact holder 342 is provided with an engagement pin 348 which engages with an engagement hole 346 of the shift lock plate 318. The contact holder 342 can move together with the shift lock plate 318, and is provided with moving contacts 350 which contact the fixed contacts of the circuit plate 344. Due to the contact holder 342 moving together with the shift lock plate 318, the moving contacts 350 change the fixed contacts of the circuit plate 344 which contact the moving contacts 350. The shift lock plate 318 can thereby output a P position detection signal which detects the P position in which the shift lock plate 318 is at the upper position.

An unillustrated shift lock control computer is further provided. The shift lock control computer is connected to the solenoid 330 and the shift lock control switch 338 via separate connectors 352, 353 respectively, and is connected to a stop lamp switch. When the shift lever 300 is at the P position and the brake is depressed so that the stop lamp switch is on, the solenoid 330 is operated. When the brake is not depressed and the stop lamp switch is off, even if the shift lever 300 is at the P position, the solenoid 330 is not activated, and shifting from the P position to another position is prevented when the brake is not depressed.

Further, a shift lock release lever 354 (shift lock release portion) is provided at the shift lock unit. The intermediate portion of the shift lock release lever 354 fits with the leading end portion of the upper guide pin 322 so that the shift lock release lever 354 pivots freely around the guide pin 322. The bottom end portion of the shift lock release lever 354 engages with an operation piece 356 which is provided upright from one end portion of the stopper 326. Even if the solenoid 330 is not operated, the stopper 326 can be forcibly pivoted so that the stopper 326 separates from the shift lock plate 318, by pushing an operation portion 358 at the upper end of the shift lock release lever 354 against the urging force of a torsion coil spring 360 and pivoting the shift lock release lever 354.

In the above-described conventional shift lock unit, the solenoid 330 and the shift lock control switch 338 are connected to the shift lock control computer via the separate connectors 352, 353 provided respectively thereat. The number of structural parts therefore increases correspondingly, which leads to an increase in size.

Further, two guide pins 322 which move and guide the shift lock plate 318 in the vertical direction are provided. Therefore, a corresponding wide space is necessary, which also results in an increase in size. In addition, the movement of the shift lock plate 318 in the vertical direction is guided by the two guide pins 322 of the bracket 316 and by the two guide holes 320 of the shift lock plate 318. The position of the shift lock plate 318 in the moving direction of the stopper 326 is regulated by the mounting of the shift lock plate 318 to the bracket 316. Therefore, the amount of movement of the plunger 332 of the solenoid 330 necessary to reach the separated state from the engaged state at which the stopper 326 and the shift lock plate 318 are engaged, is influenced and differs in accordance with the dimensional accuracy of the bracket 316, the shift lock plate 318, the stopper 326, the solenoid 330 and the like forming the shift lock unit, and in accordance with the assembly accuracy of these components, and the like. In such cases, in order to ensure the engagement and separation of the stopper 326 and the shift lock plate 318, the amount of movement of the plunger 332 of the solenoid 330 must be set in advance so as to be large and so as to have a certain margin. This leads to a further increase in size.

The bracket 316 is metal and is press-worked. This results in an increase in size caused by the management of the materials and the like.

Because the stopper 326 pivots, the region of movement thereof is large, which also results in an increase in size.

The shift lock release lever 354 is provided separately from the stopper 326 and pivots, resulting in an increase in size. Because there are many parts, costs also increase.

Further, between the fitting hole 334 of the leading end portion of the plunger 332 and the operation pin 336 at the other end portion of the stopper 326, there is separation of the contact between the fitting hole 334 and the operation pin 336 when the solenoid 330 is operated. This results in generation of striking sounds.

SUMMARY OF THE INVENTION

In view of the aforementioned, an object of the present invention is to provide a shift lock unit which aims for compactness. Another object of the present invention is to provide a shift lock unit which, in addition to aiming for compactness, prevents generation of striking sounds.

A first aspect of the present invention is a shift lock unit comprising: a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation; a stopper moving in a direction intersecting a direction of movement of the shift lock plate, which moves due to movement of the grooved pin in the axial direction of the shift lever, such that the stopper freely engages with and separates from the shift lock plate, and in an engaged state of the stopper and the shift lock plate, movement of the shift lock plate due to movement of the grooved pin in the axial direction of the shift lever is not possible and movement of the grooved pin in the axial direction of the shift lever is prevented, and in a separated state of the stopper and the shift lock plate, movement of the shift lock plate due to movement of the grooved pin in the axial direction of the shift lever is possible and movement of the grooved pin in the axial direction of the shift lever is permitted; stopper driving means for driving the stopper; a detecting switch engaging with the shift lock plate and detecting whether the shift lever is in the P position on the basis of a position of movement of the shift lock plate; power input connector pins formed at power input terminals of the stopper driving means; and signal output connector pins formed at signal output terminals of the detecting switch, and the detecting switch and the shift lock plate engage, and the signal output connector pins are positioned in a row with the power input connector pins and the signal output connector pins together with the power input connector pins are fit with a single female-type connector at wiring between the stopper driving means as well as the detecting switch, and a shift lock controller which controls the stopper driving means to prevent shifting from the P position to another position when a brake pedal is not depressed.

A second aspect of the present invention is a shift lock unit comprising: a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation; a stopper moving in a direction intersecting a direction of movement of the shift lock plate, which moves due to movement of the grooved pin in the axial direction of the shift lever, such that the stopper freely engages with and separates from the shift lock plate, and in an engaged state of the stopper and the shift lock plate, movement of the shift lock plate due to movement of the grooved pin in the axial direction of the shift lever is not possible and movement of the grooved pin in the axial direction of the shift lever is prevented, and in a separated state of the stopper and the shift lock plate, movement of the shift lock plate due to movement of the grooved pin in the axial direction of the shift lever is possible and movement of the grooved pin in the axial direction of the shift lever is permitted; stopper driving means for driving the stopper; a detecting switch engaging with the shift lock plate and detecting whether the shift lever is in the P position on the basis of a position of movement of the shift lock plate; signal output connector pins provided at the detecting switch and formed at signal output terminals of the detecting switch; and power input connector pins provided at the detecting switch, and in a state in which the detecting switch and the shift lock plate are engaged, the power input connector pins are connected to power input terminals of the stopper driving means via a contacting means which contacts, and the power input connector pins together with the signal output connector pins are fit with a single female-type connector at wiring between the detecting switch as well as the stopper driving means, and a shift lock controller which controls the stopper driving means to prevent shifting from the P position to another position when a brake pedal is not depressed.

A third aspect of the present invention is a shift lock unit comprising: a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation; a stopper moving in a direction intersecting a direction of movement of the shift lock plate, which moves due to movement of the grooved pin in the axial direction of the shift lever, such that the stopper freely engages with and separates from the shift lock plate, and in an engaged state of the stopper and the shift lock plate, movement of the shift lock plate due to movement of the grooved pin in the axial direction of the shift lever is not possible and movement of the grooved pin in the axial direction of the shift lever is prevented, and in a separated state of the stopper and the shift lock plate, movement of the shift lock plate due to movement of the grooved pin in the axial direction of the shift lever is possible and movement of the grooved pin in the axial direction of the shift lever is permitted; stopper driving means having a moved/driven shaft which is moved and driven in an axial direction, the stopper being mounted to the moved/driven shaft; a detecting switch engaging with the shift lock plate, and detecting whether the shift lever is in the P position on the basis of a position of movement of the shift lock plate, and operating the stopper driving means to prevent shifting from the P position to another position when a brake pedal is not depressed; and guiding means having a guiding pin and allowing the shift lock plate to freely move in a direction perpendicular to the guide pin and to freely pivot around the guide pin in a direction of movement of the stopper, the guiding means having an urging means for urging the shift lock plate to pivot around the guide pin to abut a fixed portion of the stopper driving means, the guiding means moving and guiding in a direction perpendicular to the guide pin the shift lock plate, which moves due to movement of the grooved pin in the axial direction of the shift lever, while making the shift lock plate slidingly contact the fixed portion of the stopper driving means.

A fourth aspect of the present invention is a shift lock unit comprising: a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation; a stopper moving in a direction intersecting a direction of movement of the shift lock plate, which moves due to movement of the grooved pin in the axial direction of the shift lever, such that the stopper freely engages with and separates from the shift lock plate, and in an engaged state of the stopper and the shift lock plate, movement of the shift lock plate due to movement of the grooved pin in the axial direction of the shift lever is not possible and movement of the grooved pin in the axial direction of the shift lever is prevented, and in a separated state of the stopper and the shift lock plate, movement of the shift lock plate due to movement o the grooved pin in the axial direction of the shift lever is possible and movement of the grooved pin in the axial direction of the shift lever is permitted; stopper driving means having a moved/driven shaft which is moved and driven in an axial direction, the stopper being mounted to the moved/driven shaft; a detecting switch engaging with the shift lock plate, and detecting whether the shift lever is in the P position on the basis of a position of movement of the shift lock plate, and controlling the stopper driving means to prevent shifting from the P position to another position when a brake pedal is not depressed; and an elastically deforming portion provided between the stopper and the moved/driven shaft, the elastically deforming portion applying urging force in a direction of making the stopper follow movement of the moved/driven shaft.

A fifth aspect of the present invention is a shift lock unit comprising: a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation; a stopper moving in a direction intersecting a direction of movement of the shift lock plate, which moves due to movement of the grooved pin in the axial direction of the shift lever, such that the stopper freely engages with and separates from the shift lock plate, and in an engaged state of the stopper and the shift lock plate, movement of the shift lock plate due to movement of the grooved pin in the axial direction of the shift lever is not possible and movement of the grooved pin in the axial direction of the shift lever is prevented, and in a separated state of the stopper and the shift lock plate, movement of the shift lock plate due to movement of the grooved pin in the axial direction of the shift lever is possible and movement of the grooved pin in the axial direction of the shift lever is permitted; stopper driving means having a moved/driven shaft which is moved and driven in an axial direction, the stopper being mounted to the moved/driven shaft; a detecting switch engaging with the shift lock plate, and detecting whether the shift lever is in the P position on the basis of a position of movement of the shift lock plate, and controlling the stopper driving means to prevent shifting from the P position to another position when a brake pedal is not depressed; and a shift lock release portion formed integrally with the stopper, and when the shift lock release portion is pressed in a direction intersecting a direction of movement of the stopper, the stopper is moved in a direction of separating from the shift lock plate.

In accordance with each of the aspects of the present invention, the stopper driving means drives the stopper which moves so as to freely engage with and separate from the shift lock plate. The detecting switch engages with the shift lock plate, and detects whether the shift lever is at the P position in accordance with the position of movement of the shift lock plate. The stopper driving means and the detecting switch are connected to the shift lock controller which controls the stopper driving means.

When the shift lever is in the P position and the brake pedal is depressed, the stopper separates from the shift lock plate. In this separated state, movement of the shift lock plate due to movement of the grooved pin in the axial direction of the shift lever becomes possible, and movement of the grooved pin in the axial direction of the shift lever is permitted. Accordingly, shifting from the P position to another position is permitted.

When the shift lever is in the P position but the brake pedal is not depressed, the stopper engages with the shift lock plate. In this engaged state, movement of the shift lock plate due to movement of the grooved pin in the axial direction of the shift lever becomes impossible, and movement of the grooved pin in the axial direction of the shift lever is prevented. Accordingly, shifting from the P position to another position is prevented.

In accordance with the first aspect of the present invention, the power input connector pins of the stopper driving means are at the stopper driving means, and the signal output connector pins of the detecting switch are at the detecting switch. In the state in which the detecting switch and the shift lock plate are engaged, the power input connector pins and the signal output connector pins are positioned in a row and fit with a single female-type connector so that wiring is formed at once between the stopper driving means as well as the detecting switch, and the shift lock controller. Accordingly, a single male-type connector suffices at the shift lock at the wiring between the stopper driving means as well as the detecting switch, and the shift lock controller. As compared with a conventional structure in which separate connectors are required for the stopper driving means and the detecting switch respectively, fewer structural parts are required, and the entire structure can be made more compact.

In accordance with the second aspect of the present invention, the power input connector pins of the stopper driving means and the signal output connector pins of the detecting switch are both disposed at the detecting switch. When the detecting switch and the shift lock plate are in an engaged state, the power input connector pins and the power input terminals of the stopper driving means contact via the contacting means. The power input connector pins and the signal output connector pins are fit with a single female-type connector, and wiring is formed at once between the stopper driving means as well as the detecting switch, and the shift lock controller. In this way as well, a single male-type connector suffices at the shift lock at the wiring between the stopper driving means as well as the detecting switch, and the shift lock controller. Fewer structural parts are required, and the entire structure can be made more compact.

In accordance with the third aspect of the present invention, the shift lock plate is urged to pivot around the guide pin, and abuts the fixed portion of the stopper driving means. The shift lock plate, which moves due to the movement of the grooved pin in the axial direction of the shift lever, is moved and guided in a direction perpendicular to the guide pin while slidingly contacting the fixed portion of the stopper driving means. In this way, a single guide pin suffices to move and guide the shift lock plate. As compared to a conventional structure in which two guide pins are required to move and guide a shift lock plate, space can be conserved, and the entire structure can be made more compact. Further, the shift lock plate is urged to rotate around the guide pin and abuts the fixed portion of the stopper driving means, and the stopper is mounted to the moved/driven shaft of the stopper driving means. Therefore, the position at which the stopper separates from the shift lock plate is determined with the fixed portion of the stopper driving means as a reference. The amount of movement of the moved/driven shaft required in order to reach the separated state from the engaged state of the stopper and the shift lock plate is fixed, and is not influenced by the dimensional accuracy of the respective structural parts of the shift lock unit or by the assembly accuracy or the like. Proper engagement and separation of the stopper with the shift lock plate is realized by a proper amount of movement of the moved/driven shaft. Compactness is achieved as compared with a conventional structure which necessitates that the amount of movement of a moved/driven shaft be large and be set with a margin.

In accordance with the fourth and fifth aspects of the present invention, the stopper is mounted to the moved/driven shaft of the stopper driving means and moves in the axial direction of the moved/driven shaft. Therefore, the entire structure can be made more compact than a conventional structure in which the stopper pivots and the region of movement is made large.

In addition, in accordance with the fourth aspect of the present invention, between the moved/driven shaft of the stopper driving means and the stopper, the elastically deforming portion applies urging force in a direction of making the stopper follow the movement of the moved/driven shaft. Separation of the contact between the moved/driven shaft and the stopper is prevented, and generation of striking sounds during operation is eliminated.

In accordance with the fifth aspect of the present invention, the shift lock release portion is formed integrally with the stopper. Therefore, as compared with a conventional structure in which the shift lock release portion is provided separately from the stopper and pivots, the shift lock unit can be made markedly compact, the number of parts can be reduced, and costs can be reduced.

As described above, in accordance with the present invention, the shift lock unit can be made compact as a single female-type connector suffices at the wiring between the stopper driving means as well as the detecting switch, and the shift lock controller.

Further, in accordance with the fourth aspect, in addition to the effect of achieving compactness, generation of striking sounds during operation is eliminated.

BRIEF DESCRIPTION OF THE DRAWINGS

FIG. 7 is a front view illustrating a state in which the shift lock control switch is mounted to a solenoid in FIG. 4.

FIG. 12 is a front view illustrating a separated state of a stopper and a shift lock plate in FIG. 11.

FIG. 13 is a front view illustrating a state in which the shift lock control switch is mounted to the solenoid in FIG. 11.

DETAILED DESCRIPTION OF THE PREFERRED EMBODIMENTS

A first embodiment of a shift lock unit relating to the present invention will be described on the basis of FIGS. 1 through 9.

Figure 2:
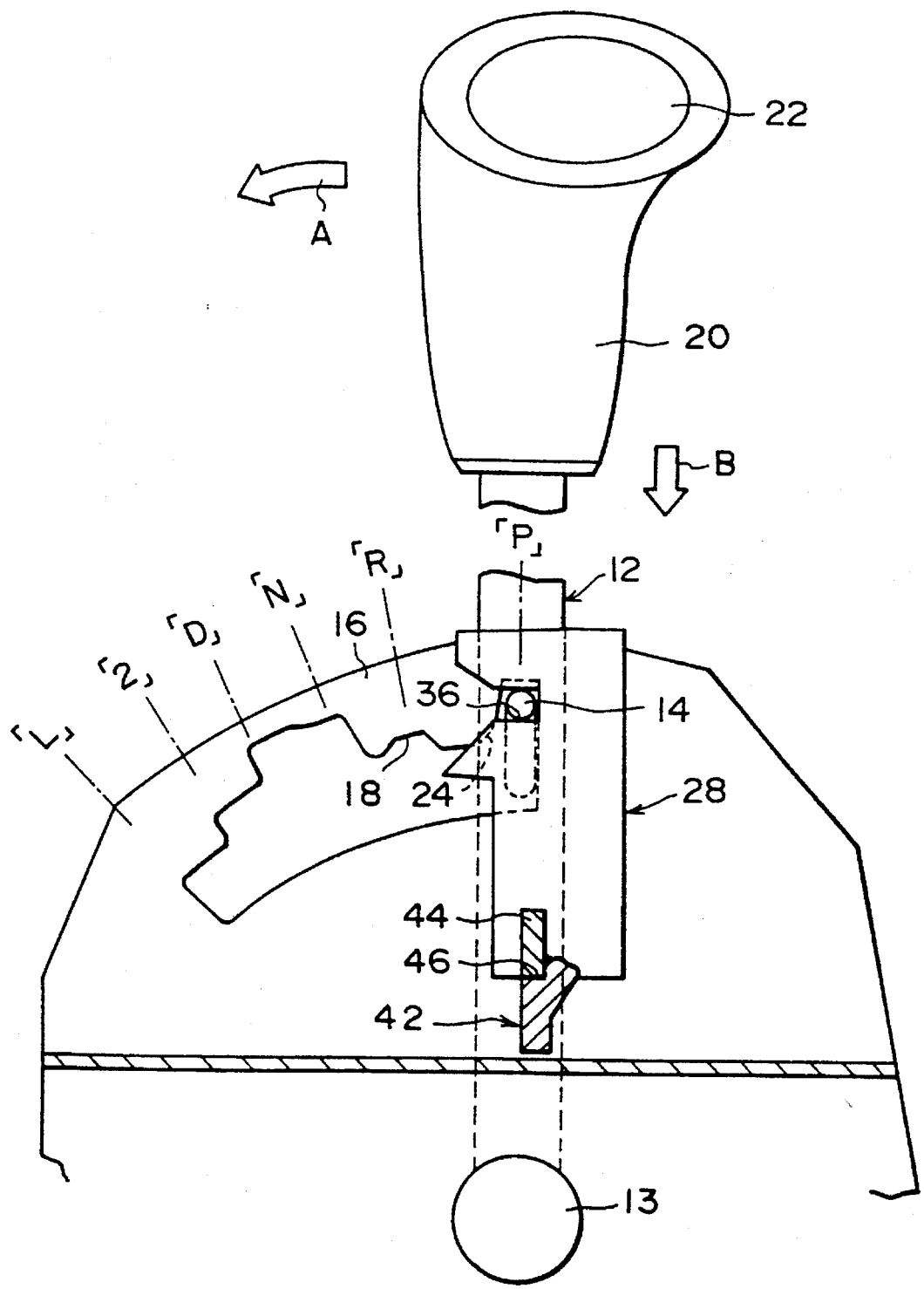
FIG. 2 is a front view of a shift lever device of an automatic transmission of an automobile, to which shift lever device the shift lock unit of the first embodiment is applied.

In the shift lever device of an automatic transmission of an automobile, as illustrated in FIG. 2, when a shift lever 12 is pivoted around a pivot shaft 13 at the bottom end of the shift lever 12, an engagement position at which a grooved pin 14, which pivots together with the shift lever 12, is engaged with a detent groove 18 of a detent plate 16 is changed, so that the shifting can be changed. For example, by pivoting the shift lever 12 in the direction of arrow A from the P position at which the axial direction of the shift lever is the vertical direction, positions such as an R position, an N position, a D position and the like can successively be obtained. In order to shift from the P position to another position, it is necessary to push a shift lever knob button 22 provided at a shift lever knob 20 and move the grooved pin 14 downward in the axial direction of the shift lever (i.e., in the direction of arrow B) so that the grooved pin 14 crosses over a convex portion 24 formed at the detent groove 18 of the detent plate 16.

When the brake is not depressed, even if the shift lever knob button 22 is pushed, the shift lock unit prevents shifting from the P position to another position by not allowing the grooved pin 14 to move downward in the axial direction of the shift lever. The shift lock unit is provided to prevent misoperation of the shift lever 12.

Figure 1:
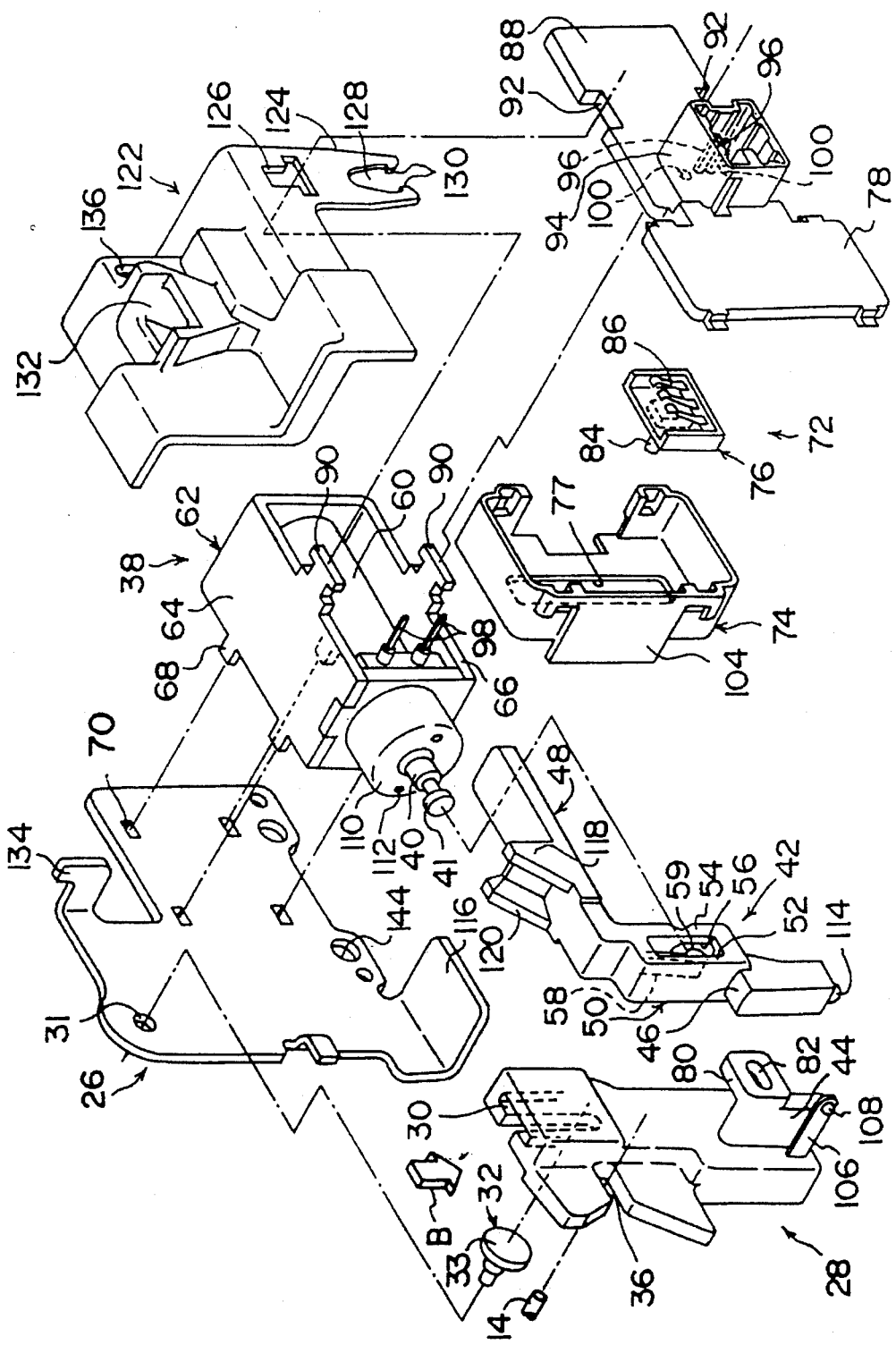
FIG. 1 is an exploded perspective view of a shift lock unit relating to a first embodiment of the present invention.
Figure 3:
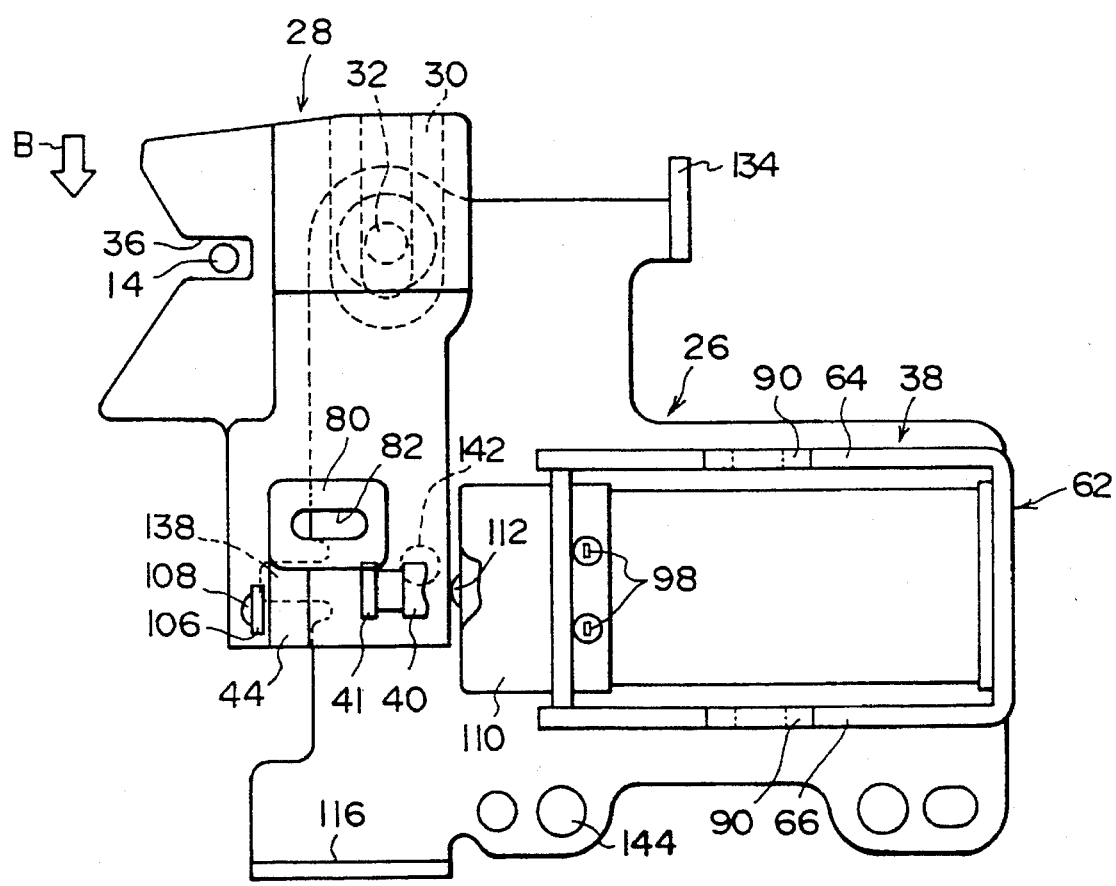
FIG. 3 is a front view illustrating a state in which a shift lock plate and a solenoid are mounted to a bracket in the shift lock unit of the first embodiment.
Figure 4:
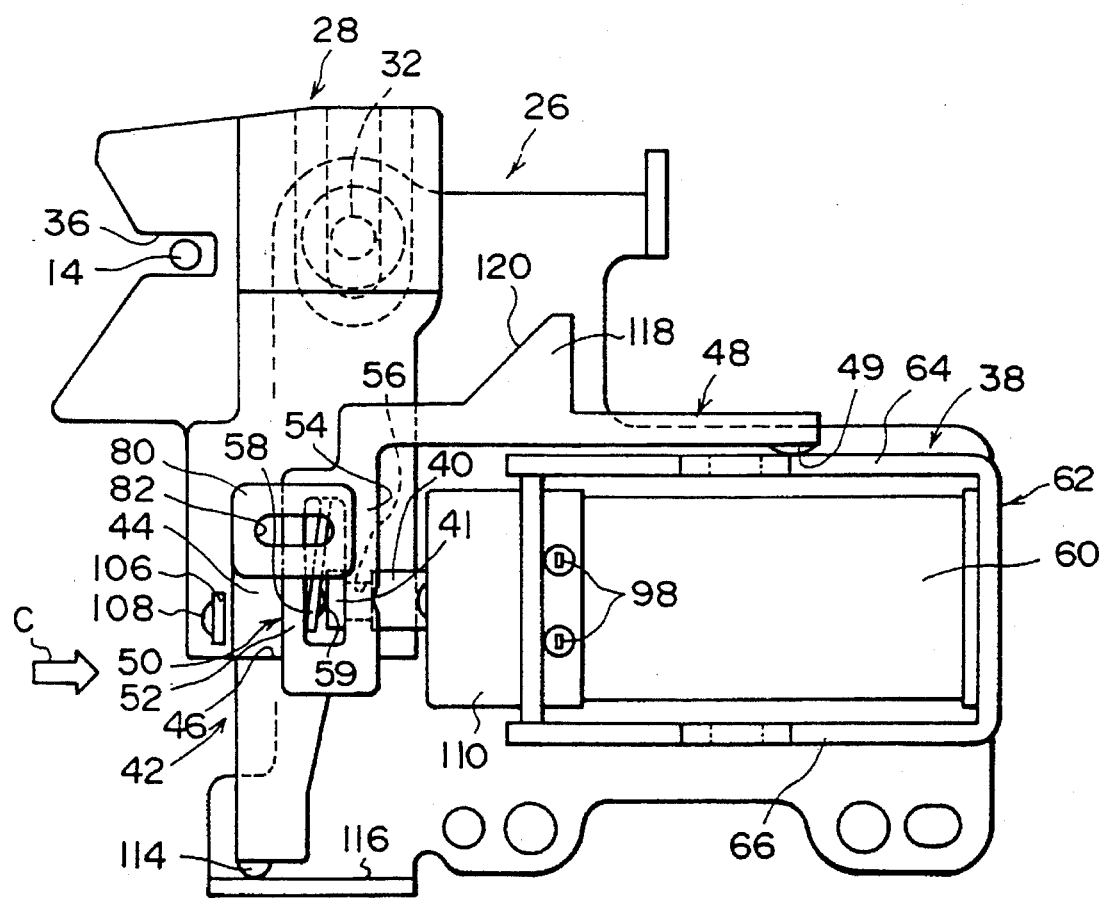
FIG. 4 is a front view illustrating a state in which a stopper is mounted to a plunger of a solenoid in FIG. 3.
Figure 5:
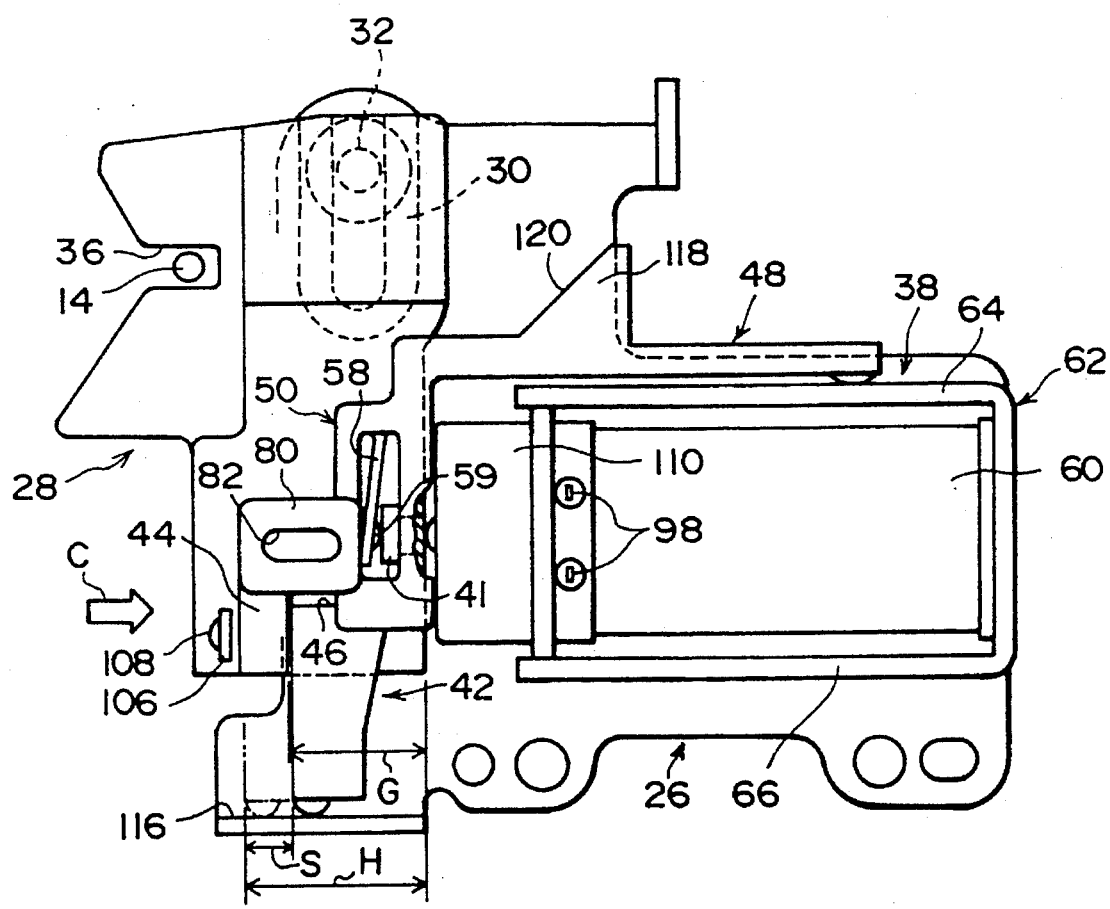
FIG. 5 is a front view illustrating a state in which the stopper separates from the shift lock plate and the shift lock plate moves downward in FIG. 4.
Figure 6:
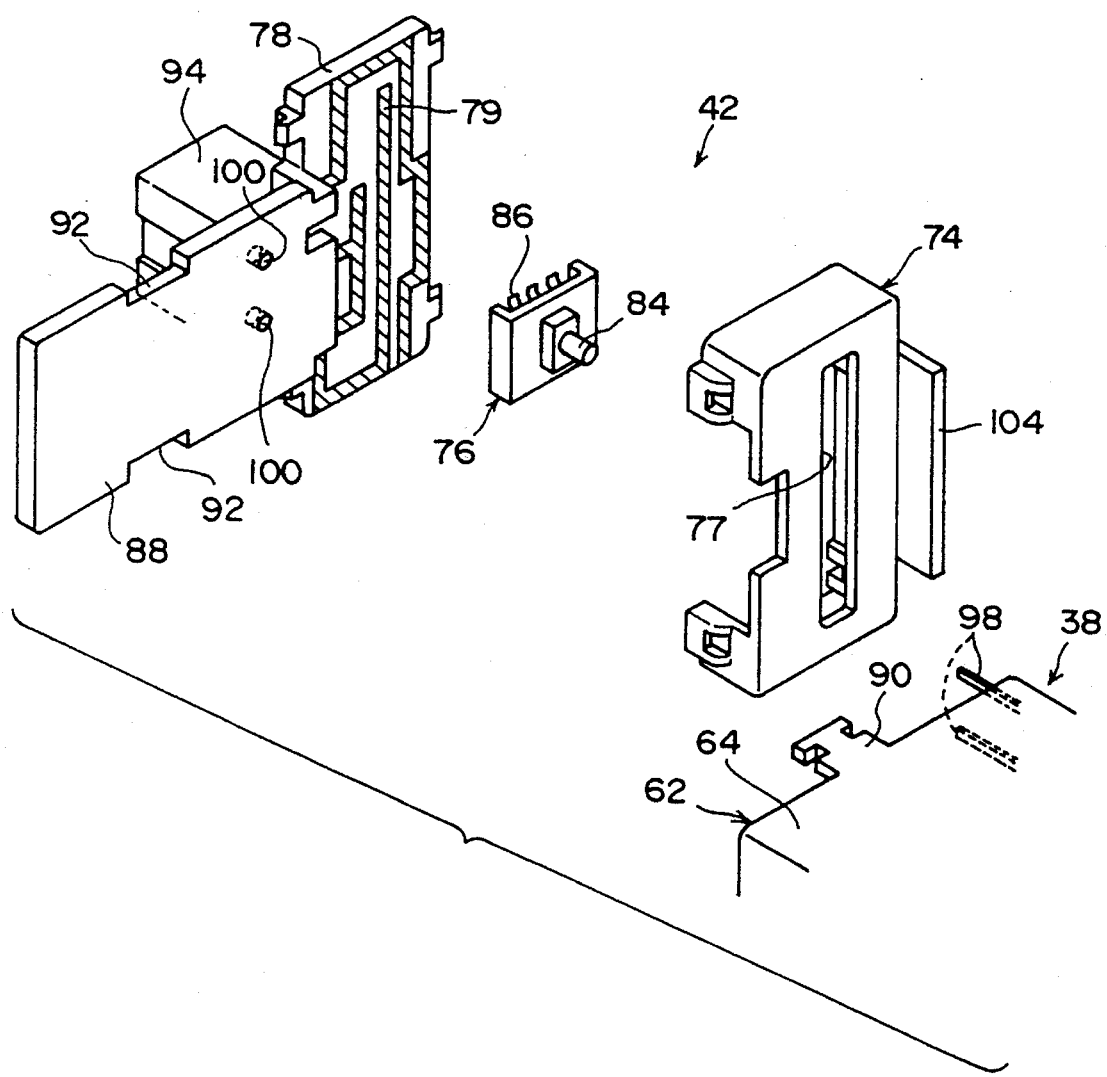
FIG. 6 is an exploded perspective view of a shift lock control switch as seen from the bracket.

As illustrated in FIGS. 1 and 3, at the shift lock unit, a shift lock plate 28 is disposed so as to oppose an upright, plate-shaped bracket 26. A guide groove 30 is formed at the upper end portion of the shift lock plate 28 in a surface which opposes the bracket 26. The guide groove 30 extends lengthwise in the vertical direction, and the upper end thereof is open. A guide pin 32 is provided at the bracket 26 so as to oppose the guide groove 30. The proximal end portion of the guide pin 32 is formed so as to have a small diameter and penetrates through and is caulked to an open hole 31 of the bracket 26 so as to be fixed to the bracket 26. The intermediate portion of the guide pin 32 is formed to have a medium-sized diameter and passes through a narrow groove mouth of the guide groove 30. The distal end portion of the guide pin 32 is formed as a large-diameter portion 33, and is positioned at the groove bottom of the guide groove 30 which groove bottom is formed to be wide. In a state in which the movement of the shift lock plate 28 in the opposite direction of the bracket 26 is regulated, the shift lock plate 28 is supported so as to freely pivot around the guide pin 32 (around the axis of the guide pin 32), and is supported so as to move freely in a direction perpendicular to the guide pin 32 along the direction in which the guide groove 30 extends (i.e., the shift lock plate 28 moves freely in a direction perpendicular to the axis of the guide pin 32). In order to fit the guide pin 32 into the guide groove 30, the guide pin 32 may be inserted into the guide groove 30 from the open top end of the guide groove 30.

Further, an engagement concave portion 36 is formed so as to project from the side edge of the upper end portion of the shift lock plate 28. The grooved pin 14 in the P position engages with the engagement concave portion 36. In the engaged state of the grooved pin 14 and the engagement concave portion 36, as the grooved pin 14 moves in the axial direction of the shift lever, the shift lock plate 28 is pushed by the grooved pin 14 and moves in the same direction.

A solenoid 38 serving as a stopper driving means is mounted to the bracket 26 at the side at which the shift lock plate 28 is disposed. The direction of movement of a plunger 40 (moved/driven shaft) of the solenoid 38 is a horizontal direction which intersects the direction of movement (vertical direction) of the shift lock plate 28. A stopper 42, which follows the plunger 40 and moves in the same direction thereof, is mounted to the tip end portion of the plunger 40. The stopper 42 is formed in an L-shape by a horizontal portion 48 and a vertical portion 50. A stepped portion 46 is formed at the lower region of the vertical portion 50. When electric power is not supplied to the solenoid 38 and the solenoid 38 is not operated, the plunger 40 is at a retracted position. At this time, the stepped portion 46 enters into the lower end surface of a protrusion 44, which is formed so as to protrude at the lower end portion of the shift lock plate 28 in the direction opposite the bracket 26, and is in an engaged state (the state in FIG. 4) with the shift lock plate 28. When electric power is supplied to the solenoid 38 and the solenoid 38 is operated, the plunger 40 is pulled in the direction of arrow C, the stepped portion 45 comes out from the lower end surface of the protrusion 44, and the stepped portion 46 and the shift lock plate 28 enter into a separated state (the state in FIG. 5 in which the stopper 42 moves from the chain line position to the solid line position). In the engaged state, downward movement of the shift lock plate 28 is not possible, movement of the grooved pin 14 downward in the axial direction of the shift lever is prevented, and shifting from the P position to another position is not possible. In the separated state, downward movement of the shift lock plate 28 is possible, and movement of the grooved pin 14 downward in the axial direction of the shift lever is permitted. After the grooved pin 14 moves downward in the axial direction of the shift lever, by pivoting the shift lever 12, the grooved pin 14 separates from the engagement concave portion 36 of the shift lock plate 28, crosses over the convex portion 24 of the detent groove 18 of the detent plate 28, and the shift lever 12 can be moved to another position.

Two vertical pieces 52, 54 are provided at the upper region of the vertical portion 50 of the stopper 42 so as to oppose each other with a gap therebetween in the direction of movement of the stopper 42. An axial hole 56 whose lower end is open is formed in the vertical piece 54 at the solenoid 38 side. The tip end portion of the plunger 40, which is inserted into the axial hole 56 from the open lower end thereof, is press-fit into and penetrates the axial hole 56 so that a large-diameter head 41 of the plunger 40 is positioned between the vertical pieces 52, 54. A presser portion 58 is cantilevered, supported at the upper end thereof so as to hang downward between the vertical pieces 52, 54. The presser portion 58 forms the elastically deforming portion and is flexibly and elastically deformable. A protrusion 59 of the distal end portion (bottom end portion) of the presser portion 58 presses the large-diameter head 41 of the plunger 40 and urges the large-diameter head 41 in a direction of following the plunger 40 of the stopper 42, so that the large-diameter head 41 is pressed against the vertical piece 54.

A solenoid coil 60 is supported between an upper wall 64 and a lower wall 66 of a supporting frame 62. Mounting portions 68 are formed at the upper wall 64 and lower wall 66 so as to protrude toward the bracket 26. The mounting portions 68 penetrate through and are caulked to open holes 70 of the bracket 26 so that the solenoid 38 is mounted to the bracket 26.

A shift lock control switch 72 forming a detecting switch is mounted to the solenoid 38°. At the shift lock control switch 72, a contact holder 76 is accommodated within a switch cover 74 which is positioned to oppose the shift lock plate 28 and which is shaped as a rectangular box whose side opposite the shift lock plate 28 is open. A circuit plate 78 see FIG. 6) having fixed contacts 79 at the inner surface thereof is elastically fit into the open portion of the switch cover 74 so that the switch cover 74 is closed by the circuit plate 78. The contact holder 76 has an engagement pin 84 which penetrates through an elongated hole 77 which is formed at the bottom of a switch cover 74 and extends in the vertical direction, in order to engage with an engagement hole 82 which is formed in a switch opposing portion 80 at which the protrusion 44 of the shift lock plate 28 is further bent so as to oppose the switch cover 74. Due to the engagement of the engagement pin 84 with the engagement hole 82, the contact holder 76 can move together with the shift lock plate 28 in the vertical direction. The contact holder 76 is equipped with moving contacts 86 which contact the fixed contacts 79 of the circuit plate 78. When the shift lock plate 28 is at the upper position and when the shift lock plate 28 is at the lower position, the moving contacts 86 change the fixed contacts 79 which contact the moving contacts 86. It can be detected whether the shift lever 12 is at the P position, and a detection signal can be outputted. The engagement hole 82 is an elongated hole whose longitudinal direction is along the axial direction of the plunger 40 of the solenoid 38. The aligning of the shift lock control switch 72 and the stopper 42 is activated by the amount by which the engagement pin 84 can move relatively along the longitudinal direction of the engagement hole 82.

As illustrated in FIG. 7, an extended plate 88 which extends toward the solenoid coil 60 is formed integrally with the circuit plate 78. The extended plate 88 is held between an outer cover 122 which will be described later and the supporting frame 62 of the solenoid 38 so as to cover the side of the solenoid coil 60 (see FIG. 8). When the engagement pin 84 of the contact holder 76 engages with the engagement hole 82 of the shift lock plate 28, the shift lock control switch 72 is mounted to the solenoid 38. Mounting portions 90 are formed at the upper wall 64 and the lower wall 66 of the supporting frame 62 so as to protrude toward the side opposite the bracket 26. Rectangular notches 92, through which the mounting portions 90 penetrate, are formed at the upper and lower edges of the extended plate 88 so as to correspond to the mounting portions 90.

A rectangular connector tube 94 protrudes from the surface of the extended plate 88 at the side opposite the solenoid 38. Signal output connector pins 96 are formed at signal output terminals which are connected to the fixed contacts 79 of the circuit plate 78 and which pass through the extended plate 88 in the direction of thickness thereof. The signal output connector pins 96 project into the tube interior of the connector tube 94 from the tube bottom in the direction of thickness thereof. Further, through holes 100 are formed in the tube bottom of the connector tube 94.

Power input connector pins 98 are formed at the power output terminals of the solenoid 38 so as to protrude toward the extended plate 88. When the shift lock plate 28 is mounted, the power input connector pins 98 penetrate through the through holes 100 and project into the interior of the connector tube 94. In this way, the signal output connector pins 96 and the power input connector pins 98 are positioned in a row within the connector tube 94, and can fit with a single female-type connector 97. Via this female-type connector 97, wiring 97.1 is formed between the solenoid 38 as well as the shift lock control switch 72, and a shift lock control computer 97.2.

An unillustrated stop lamp switch is also connected to the shift lock control computer 97.2. The shift lock control computer 97.2 effects control such that when the shift lever 12 is in the P position and the shift lock control switch 72 is on and the brake 97.5 is depressed and the stop lamp switch is on, electric power is supplied to the solenoid 38 and the solenoid 38 is operated. Further, the shift lock control computer 97.2 effects control such that if the brake 97.2 is not depressed and the stop lamp switch is off even if the shift lever 12 is in the P position and the shift lock control switch 72 is on, electric power is not supplied to the solenoid 38 and the solenoid 38 is not operated. When the brake 97.5 is not depressed, shifting from the P position to another position is prevented. When the shift lock plate 28 moves downward together with the grooved pin 14 and reaches the lower position, the shift lock control computer effects control such that the supply of electric power to the solenoid 38 is stopped. The plunger 40 is always urged in the pulling-out direction by a spring (unillustrated) within the solenoid 38. When the supply of electric power to the solenoid 38 is stopped, the pulling-out of the plunger 40 is made possible by the spring within the solenoid. When the shift lock plate 28 is at the bottom position (the position in FIG. 5), the protrusion 44 is in the moving path of the stopper 42. Therefore, the vertical portion 50 of the stopper 42 abuts and is restricted by the protrusion 44, and the pulling-out of the plunger 40 is prevented. The grooved pin 14 again engages with the engagement concave portion 36 of the shift lock plate 28 and moves upward. Accordingly, the shift lock plate 28 moves upward. When the shift lock plate 28 reaches the top position (the position in FIG. 4), the protrusion 44 is withdrawn from the moving path of the stopper 42, and the plunger 40 is pulled out. The stepped portion 46 enters into the lower surface of the protrusion 44, and the stopper 42 and the shift lock plate 28 are set in an engaged state.

A guide portion 104 is formed at the switch cover 74. A guide portion 106 (urging means) is cantilevered and supported so as to protrude at the lower end portion of the shift lock plate 28. The guide portion 106 is elastically and flexibly deformable. When the shift lock control switch 72 is mounted, the guide portion 104 and the guide portion 106 are positioned so as to oppose each other. The guide portion 104 pushes a guide protrusion 108 of the tip end of the guide portion 106. The shift lock plate 28 is urged 1o pivot in the direction of arrow D around the guide pin 32 (see FIG. 7) so that the side edge of the shift lock plate 28 abuts a guide protrusion 112 (the fixed portion of the stopper driving means) on the front surface of a solenoid head 110. By slidingly contacting the shift lock plate 28 with the guide protrusion 112 of the front surface of the solenoid head 110 and moving the shift lock plate 28 in a direction perpendicular to the axis of the guide pin 32, the shift lock plate 28 which moves due to the movement of the grooved pin 14 is moved and guided in the vertical direction. The engagement position, at which the grooved pin 14 and the engagement concave portion 36 of the shift lock plate 28 are engaged, shifts from the vertical line on which the guide pin 32 passes. When the shift lock plate 28 is pushed downward by the grooved pin 14, rotational urging force around the guide pin 32 is applied to the shift lock plate 28 so that the side edge of the shift lock plate 28 is pushed against the guide protrusion 112 of the front surface of the solenoid head 110. In FIG. 1, there are two protrusions on the front surface of the solenoid head 110. However, the protrusion at the bracket 26 side is the guide protrusion 112.

At the bottom end of the bracket 26, a horizontal portion 116 is bent so as to oppose a protrusion 114 at the lower end surface of the vertical portion 50 of the stopper 42. When the stopper 42 is in an engaged state with the shift lock plate 28, even if the shift lock plate 28 is pushed downward and accordingly the stopper 42 is pushed downward the horizontal portion 116 abuts and supports the protrusion 114 and can receive the pushing force thereof. In this way, no excessive load is applied to the plunger 40 in a direction perpendicular to the axis thereof.

The horizontal portion 8 of the stopper 42 is positioned on the top wall 54 of the supporting frame 62 of the solenoid 38. A shift lock release portion 118, which forms the shift lock release portion of the present invention, protrudes at the top surface of the horizontal portion 48. The shift lock release portion 118 is triangular. By pushing downward on inclined portions 120 of the shift lock release portion 118, a protrusion 49 of the bottom surface of the horizontal portion 48 abuts the top wall 64 (see FIG. 7), and the horizontal portion 48 slides along the top wall. The solenoid 38 is not operated, and the stopper 42 which separates from the shift lock plate 28 can be forcibly moved (the state in FIG. 5 can be reached).

Figure 8:
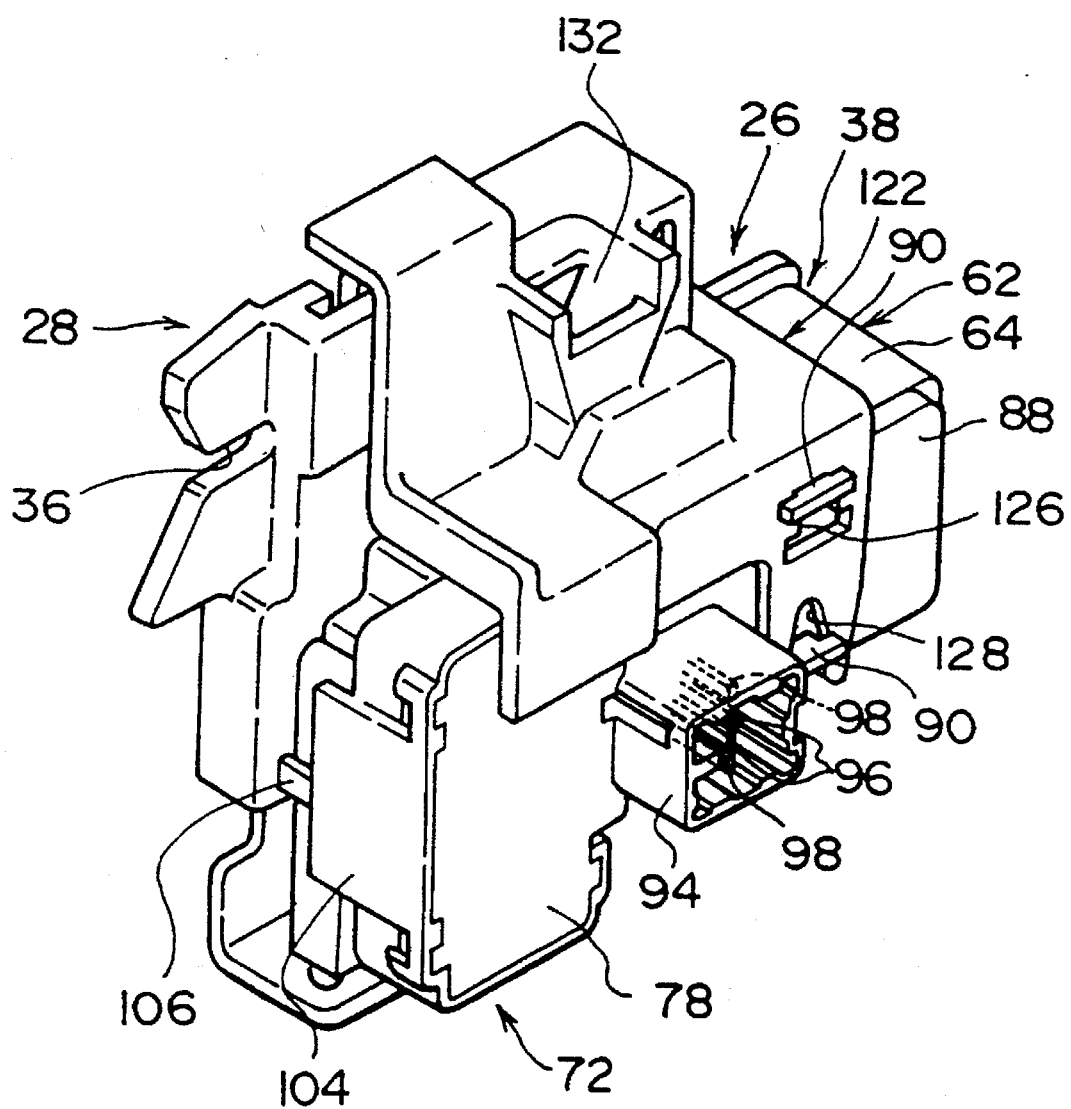
FIG. 8 is an assembled perspective view of the shift lock unit of the first embodiment.

The outer cover 122 is bent so as to extend over the solenoid 38 and the shift lock plate 28 from the shift lock control switch 72 (see FIG. 8). The outer cover 122 is provided with a mounting portion 124 which hangs downward. An inverted T-shaped mounting hole 126, whose upper side is narrow and whose lower side is wide, is provided in the upper end portion of the mounting portion 124. A mounting hole 128 whose lower end is open is provided at the lower end portion of the mounting portion 124. The respective intermediate portions of the mounting portions 90 of the upper wall 64 and the lower wall 66 of the supporting frame 62 of the solenoid 38 are narrow. The mounting portion 90 which is positioned at the upper side is inserted into the wide lower side of the mounting hole 126, and the mounting portion 90 which is positioned at the lower side is inserted into the mounting hole 128. Thereafter, if the outer cover 122 is shifted downward, the narrow intermediate portion of the upper mounting portion 90 fits into the narrow upper side of the mounting hole 124, and the narrow intermediate portion of the lower mounting portion 90 is elastically nipped by protrusions 130 of the open distal end of the mounting hole 125. In this way, the outer cover 122 is installed, and the extended plate 88 of the shift lock control switch 72 is held between the outer cover 122 and the supporting frame 52. When the shift lock control switch 72 is to be removed from the solenoid 38, the outer cover 122 may be shifted upward.

An engagement convex portion 134 and an engagement concave portion 136, which engage when the outer cover 122 is installed, are provided between the outer cover 122 and the bracket 26 and reinforce the installed state and the retaining of the outer cover 122.

An opening 132 which opposes the inclined portions 120 of the shift lock release portion 118 is formed in the outer cover 122. The inclined portions 120 can be pushed by an unillustrated separate member via the opening 132.

Figure 9:
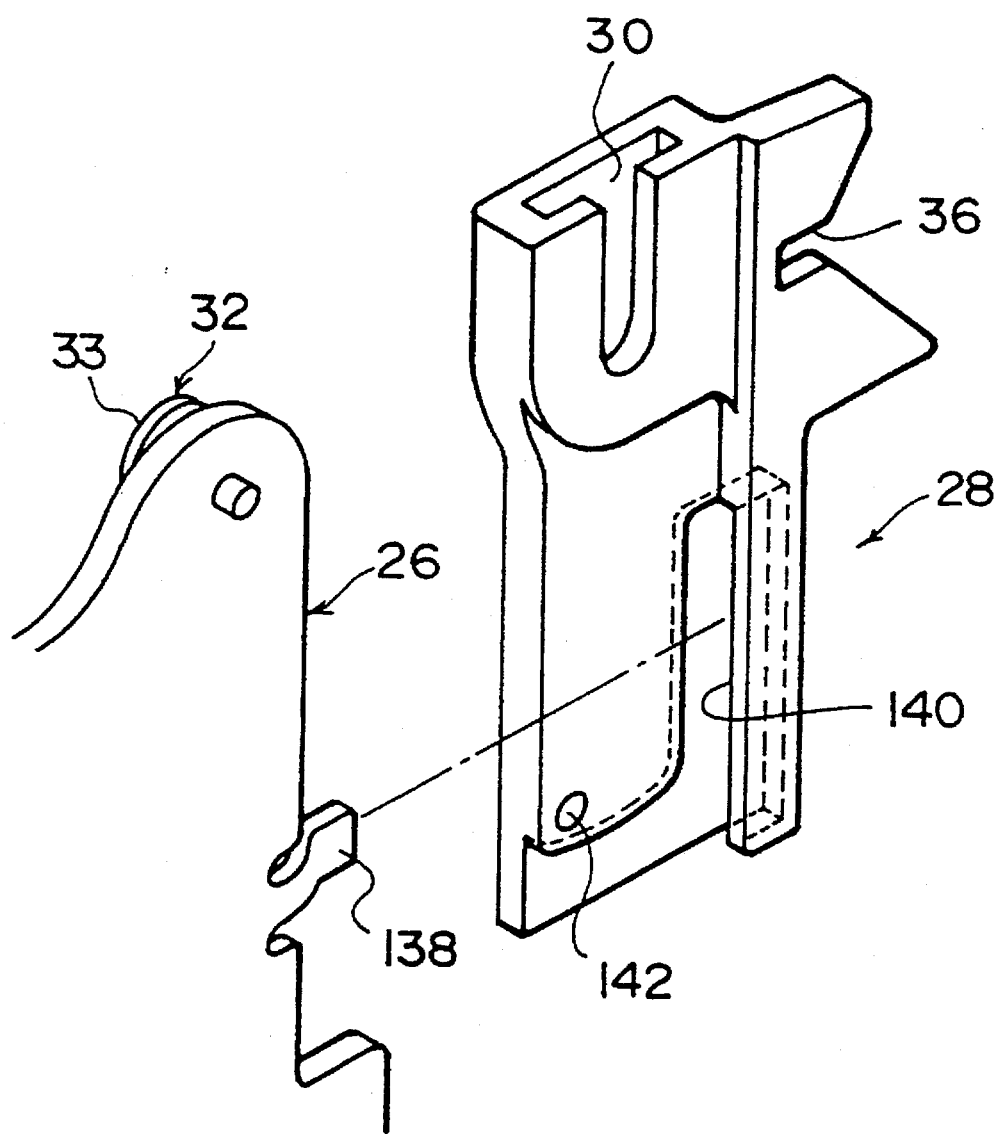
FIG. 9 is an exploded perspective view illustrating the shift lock plate and the bracket in the shift lock unit of the first embodiment.
Figure 10:
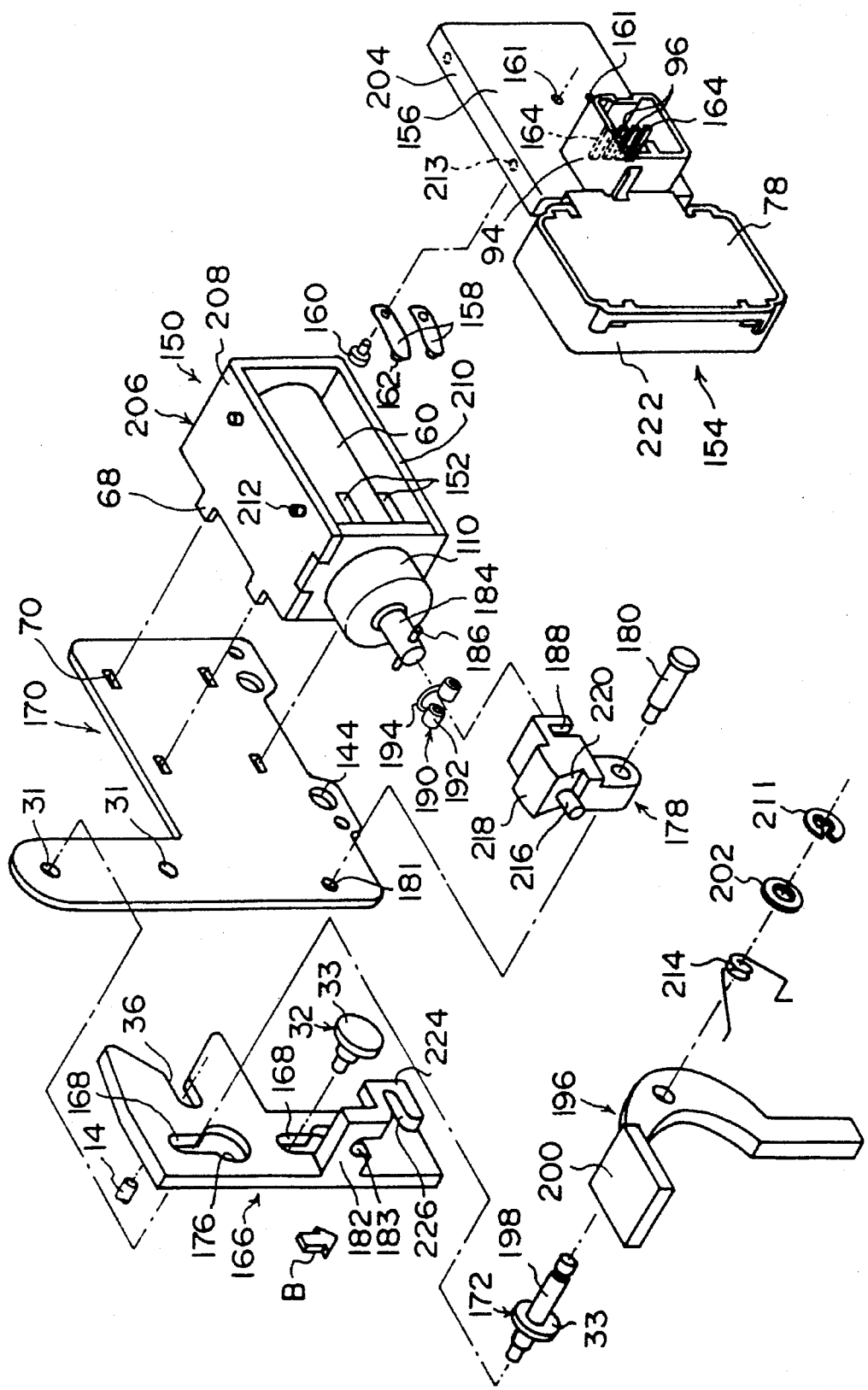
FIG. 10 is an exploded perspective view of a shift lock unit of a second embodiment.
Figure 11:
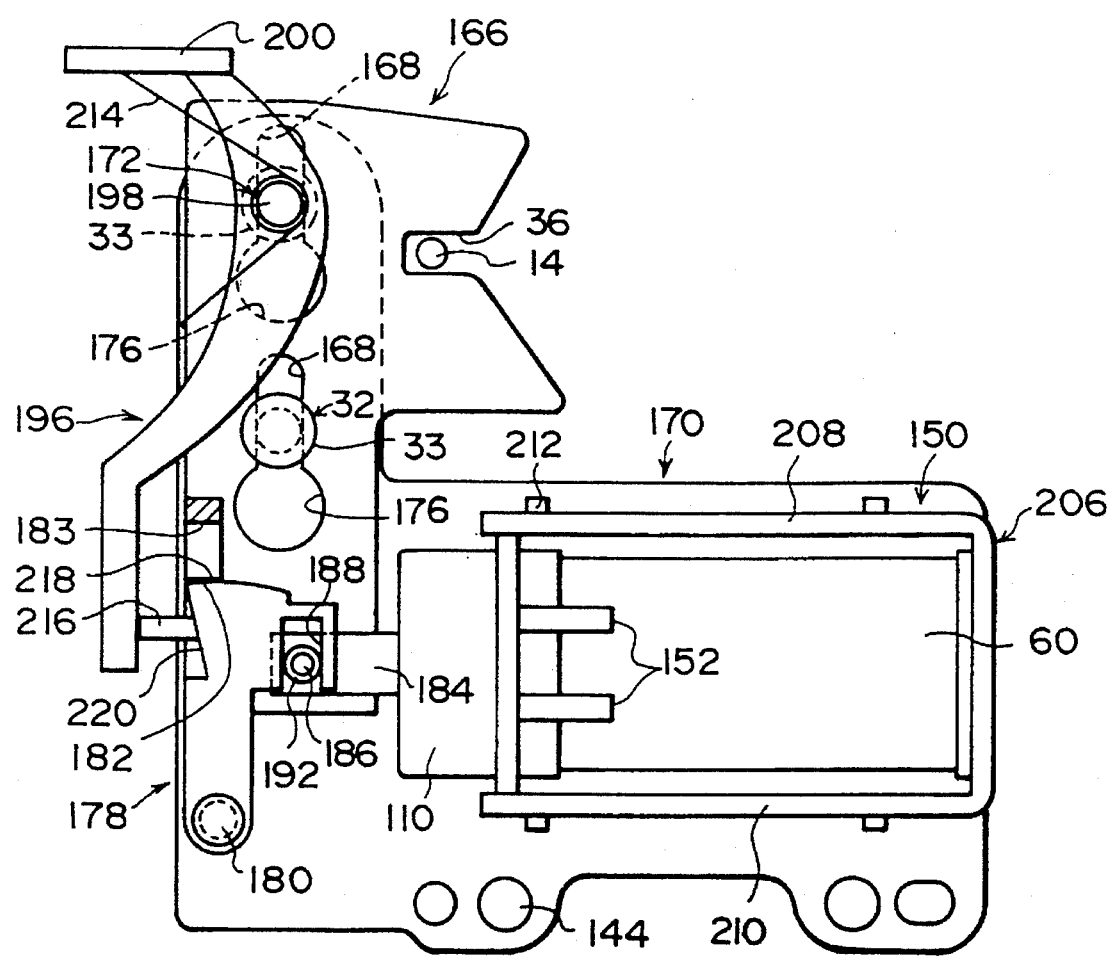

As illustrated in FIG. 9, a convex portion 138 is formed at the bracket 26. A groove portion 140, which extends vertically and opposes the convex portion 138, is formed at the shift lock plate 28. The convex portion 138 is fit with the groove portion 140 so as to regulate the movement of the shift lock plate 28 in the direction opposite the bracket 26. As the shift lock plate 28 moves in the vertical direction the convex portion 138 moves within the groove portion 140 relatively thereto. By pivoting the shift lock plate 28 in the direction of arrow D (see FIG. 7) around the guide pin 32, the convex portion 138 can be inserted into the groove portion 140. A protrusion 142 is formed at the shift lock plate 28. The protrusion 142 point-contacts the bracket 26 in the direction opposite the shift lock plate 28 and slidingly contacts due to the vertical movement of the shift lock plate 28.

The bracket 25 is formed of metal. The shift lock plate 28, the stopper 42, and the shift lock control switch 72 (other than electrically conductive portions such as the moving contacts 86 and the fixed contacts 79) can respectively be formed of synthetic resin. Further, the shift lock plate 28, including the guide portion 106, and the stopper 42, including the presser portion 58, can respectively be formed integrally.

A mounting hole 144 for mounting to a shift lock device is formed in the bottom end portion of the bracket 26.

In accordance with the above-described structure, the solenoid 38 drives the stopper 42 which moves so as to freely engage with and separate from the shift lock plate 28. The shift lock control switch 72 engages with the shift lock plate 28. In accordance with the position of movement of the contact holder 76 which moves with the shift lock plate 28, it is detected whether the shift lever 12 is at the P position. The solenoid 38 and the shift lock control switch 72 are connected to the shift lock controller which controls the solenoid 38.

When the shift lever 12 is at the P position and the brake pedal is depressed, the stopper 42 is separated from the shift lock plate 28. In this separated state, movement of the shift lock plate 28 downward in the axial direction of the shift lever due to movement of the grooved pin 14 downward in the axial direction of the shift lever is made possible, and movement of the grooved pin 14 downward in the axial direction of the shift lever is permitted. Accordingly, shifting from the P position to another position is permitted.

When the brake pedal is not depressed even if the shift lever 12 is at the P position, the stopper 42 engages with the shift lock plate 28. In this engaged state, movement the shift lock plate 28 downward in the axial direction of the shift lever due to movement of the grooved pin 14 downward in the axial direction of the shift lever is not possible, and movement of the grooved pin 14 downward in the axial direction of the shift lever is prevented. Accordingly, shifting from the P position to another position is prevented.

Here, the power input connector pins 98 of the solenoid 38 are at the solenoid 38. The signal output connector pins 96 of the shift look control switch 72 are at the shift lock control switch 72. When the engagement pin 84 of the contact holder 76 of the shift lock control switch 72 engages with the engagement hole 82 of the switch opposing portion 80 of the shift lock plate 28 and the shift lock control switch 72 is mounted to the solenoid 38, the power input connector pins 98 and the signal output connector pins 96 are positioned in a row and fit with the single female-type connector. Wiring between the solenoid 38 as well as the shift lock control switch 72, and the shift lock controller is formed.

Accordingly, a single male-type connector suffices at the shift lock control switch 72 side at the wiring between the solenoid 38 as well as the shift lock control switch 72, and the shift lock controller. (The connector tube 94, the power input connector pins 98 within the tube, and the signal output connector pins 96 form the male-type connector.) As compared with a conventional structure requiring respectively separate connectors for the solenoid and for the shift lock control switch, the number of structural parts can be decreased, and the overall structure can be made more compact.

Further, when the engagement pin 84 of the contact holder 76 of the shift lock control switch 72 engages with the engagement hole 82 of the switch opposing portion 80 of the shift lock plate 28, the power input connector pins 98 and the signal output connector pins 96 are positioned in a row. Therefore, if the power input connector pins 98 and the signal output connector pins 96 forming the male-type connector are positioned in a row, positioning of the shift lock control switch 72 can be carried out easily when the engagement pin 84 engages with the engagement hole 82 and the shift lock control switch 72 is mounted.

In particular, because the power input connector pins 98 penetrate through the through holes 100 of the tube bottom of the connector tube 94 and project into the interior of the tube, the positioning of the shift lock control switch 72 can be carried out with high accuracy.

The shift lock plate 28 is urged to pivot around the guide pin 32 and abuts the guide protrusion 112 of the solenoid head 110. The shift lock plate 28, which moves due to the movement of the grooved pin 14 in the axial direction of the shift lever, is moved and guided in a direction perpendicular to the guide pin 32 while sweepingly contacting the guide protrusion 112 of the solenoid head 110.

In this way, a single guide pin 32 suffices to move and guide the shift lock plate 28. As compared with a conventional structure in which two guide pins are needed to move and guide a shift lock plate, space can be conserved, and the overall structure can be made more compact.

Further, the shift lock plate 28 is urged to pivot around the guide pin 32 and abuts the guide protrusion 112 of the solenoid head 110. Therefore, the position at which the stopper 42 is separated from the shift lock plate 28 is determined with the guide protrusion 112 of the solenoid head 110 as a reference. At the pull-out position of the plunger 40, the difference between a dimension H relating to the stopper 42 and a dimension G relating to the shift lock plate 28, for which the guide protrusion 112 of the solenoid head 110 serves as a reference, may be set in advance in order to make the solenoid operation stroke S smaller. The amount of movement of the plunger 40 necessary for the stopper 42 to reach the separated state from the engaged state with the shift lock plate 28 (i.e., the solenoid operation stroke) is fixed and is not influenced by the dimensional accuracy of the respective structural parts the shift lock unit or by the assembly dimensional accuracy or the like. Engagement and separation of the stopper 42 and the shift lock plate 28 are properly realized by a proper solenoid operation stroke. As compared with a conventional structure in which the amount of movement of the plunger must be set so as to be large and so as to have a margin, the entire structure can be made more compact.

The portion which the shift lock plate 28 abuts is not limited to the guide protrusion 112 of the solenoid head 110. The shift lock plate 28 may contact another region provided that that region is a fixed portion of the solenoid 38. However, due to the shift lock plate 28 abutting the guide protrusion 112 of the solenoid head 110, point contact is established and resistance to the movement of the shift lock plate 28 is decreased.

When the shift lock plate 28 moves in the vertical direction, the guide protrusion 108 of the guide portion 106 and the protrusion 142 point-contact the shift lock plate 28, which contributes to a decrease in the resistance to the movement of the shift lock plate 28.

In accordance with the structure in which the stopper 42 is mounted to the plunger 40 of the solenoid 38 and moves in the same direction as the plunger 40, the shift lock unit can be made more compact as compared with a conventional structure in which the stopper pivots and the region of movement thereof is made large.

The presser portion 58 of the vertical portion 50 of the stopper 42 applies urging force in the direction of making the stopper 42 follow the movement of the plunger 40, between the plunger 40 of the solenoid 38 and the stopper 42. In this way, separation of the contact between the plunger 40 and the stopper 42 can be prevented, and generation of striking sounds can be eliminated.

Because the shift lock release portion 118 is formed integrally with the stopper 42, the entire structure can be made markedly more compact than a conventional structure in which the shift lock release portion is provided separately from the stopper and pivots. Therefore, in accordance with the first preferred embodiment, the number of parts can be reduced, and costs can be reduced as well.

Further, in the first preferred embodiment, the guide portion 106 forms the urging means. However, the present embodiment is not limited to the same, and various types of structures, positions and configurations are possible, such as, for example, providing the urging means at the bracket. Although the presser portion 58 forms the elastically deforming portion, the position, configuration and the like of the elastically deforming portion as well may be set arbitrarily.

Next, a second preferred embodiment of the shift lock unit will be described on the basis of FIGS. 10 through 14.

In the first preferred embodiment, the power input connector pins 98 are formed at the power input terminals of the solenoid 38. However, in the second preferred embodiment, terminal plates 152 which are elongated in the axial direction of a plunger 184 are formed at the power input terminals of a solenoid 150. Long, plate-like contactors 158 which oppose the terminal plates 152 are cantilevered and fixed by rivets 160 at open holes 161 of an extended plate 156 of a shift lock control switch 154 at a surface of the extended plate 156 which faces the solenoid coil 60. The contactors 158 together with the terminal plates 152 form the contacting means. When the shift lock control switch 154 is mounted to the solenoid 150, protrusions 162 at the tip ends of the contactors 158 are elastically urged to contact the terminal plates 152. Power input connector pins 164 are in a row (in the same way as in the first embodiment) with the signal output connector pins 96 and are connected to the contactors 158 at the elongated plate 156 in the direction of thickness thereof. The power input connector pins 164 project into the interior of the connector tube 94 from the tube bottom in the direction of thickness thereof. The signal output connector pins 96 and the power input connector pins 164 form the male-type connector and can fit with a single female-type connector at the wiring between the solenoid 150 as well as the shift lock control switch 154, and the shift lock control computer (unillustrated).

In the first preferred embodiment, the shift lock plate 28 is supported by the single guide pin 32. The guide portion 106 applies rotational urging force to the shift lock plate 28 to urge the shift lock plate to pivot around the guide pin 32. The movement of the shift lock plate 28 in the vertical direction is guided by sweepingly contacting the shift lock plate 28 with the guide protrusion 112 of the front surface of the solenoid head 110 and moving the shift lock plate 28 in a direction perpendicular to the guide pin 32. However, in the second preferred embodiment, a shift lock plate 166 is provided with a guide hole 168 at the top portion and at the center portion thereof, respectively. The guide holes 168 are elongated holes which extend in the vertical direction. Open holes 31 are formed in a bracket 170 so as to correspond to the guide holes 168. Base ends of two (upper and lower) guide pins 172, 32 penetrate through the open holes 31 of the bracket 170 and are caulked and fixed. The guide pins 172, 32 penetrate through the guide holes 168. By sliding the interiors of the guide holes 168 relatively in the longitudinal direction of the holes, the shift lock plate 166 is moved and guided in the vertical direction. The large-diameter portions 33 are formed at the tip end portions of the guide pins 172, 32 which have penetrated through the guide holes 168. The large-diameter portions 33 are formed with diameters larger than the guide holes 168 in order to prevent the guide pins 172, 32 from coming out from the guide holes 168. Large-diameter holes 176 are formed continuously with the bottom ends of the guide holes 168. The large-diameter portions 33 of the guide pins 172, 32 can be made to penetrate through from the large-diameter holes 176.

Figure 12:
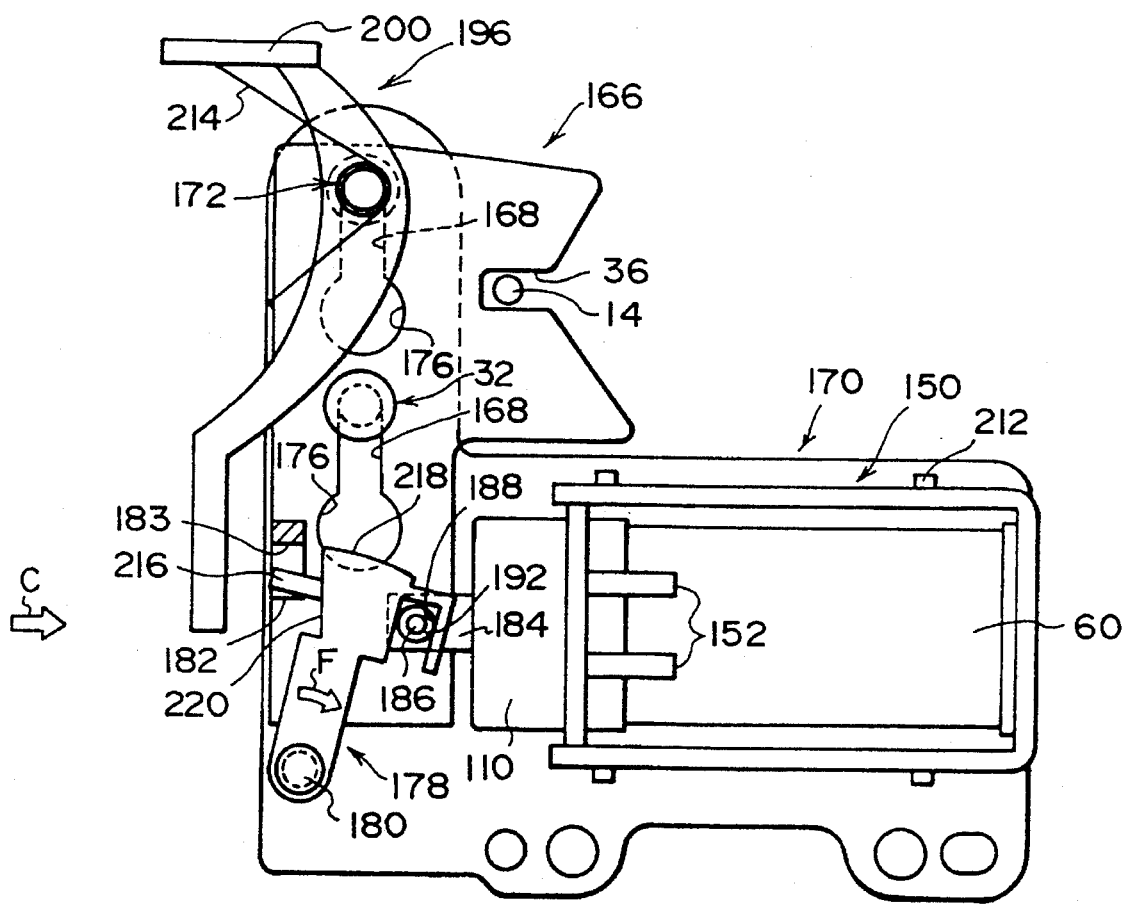
FIG. 12 is a front view illustrating the shift lock unit of the second embodiment without a shift lock control switch.

In the first preferred embodiment, the stopper 42 is mounted to the plunger 40 of the solenoid 38 and moves in the same direction as the axial direction of the plunger 40. However, in the second preferred embodiment, a stopper 178 pivots freely around a stopper shaft 180 which penetrates through the lower end portion of the stopper 178. The base end of a stopper shaft 180 penetrates through and is caulked and fixed to an open hole 181 in the bracket 170. Due to the pivoting of the stopper 178, an engaged state and a separated state can be obtained. In the engaged state (the state of FIG. 11), the upper end portion of the stopper 178 enters into the lower end surface of a protrusion 182 (corresponding to the protrusion 44 in the first preferred embodiment) of the shift lock plate 166, and engages with the shift lock plate 166. In the separated state (the state of FIG. 12), the upper end portion of the stopper 178 exits from the lower end surface of the protrusion 182 of the shift lock plate 166, and separates from the shift lock plate 166. Further, at the tip end portion of a plunger 184 of the solenoid 150, fitting pins 186, which are horizontal in a direction perpendicular to the axis of the plunger 184, project to the left and right sides as viewed from the axial direction of the plunger 184. The fitting pins 186 fit with a U-shaped fitting concave portion 188 formed in the upper end portion of the stopper 178. A cushion 190 is interposed between the fitting pins 186 and the fitting concave portion 188. The cushion 190 is formed integrally by tube portions 192, which fit with the respective fitting pins 186, and by a connecting portion 194 which connects the region between the tube portions 192. When the solenoid 150 is operated and the plunger 184 is pulled in the direction of arrow C, as illustrated in FIG. 12, the stopper 178 pivots in the direction of arrow F from the state of engagement with the shift lock plate 166 to the separated state.

An engaging surface 218 of the stopper 178, which engaging surface 218 abuts and engages the lower end surface of the protrusion 182 of the shift lock plate 166, may be formed as a circular arc shaped surface whose center is the stopper shaft 180. In this way, in the state in which the stopper 178 and the shift lock plate 166 are engaged, while the stopper 178 is pivoted, the heightwise position at which the engaging surface 218 abuts the lower end surface of the protrusion 182 of the shift lock plate 166 can be made to not vary. Further, a separation surface 220 of the stopper 178 faces the protrusion 182 of the shift lock plate 166 which moves downward in the separated state of the stopper 178 and the protrusion 182. If the separation surface 220 is inclined in the engaged state so as to be a vertical surface in the separated state of the stopper 178 and the shift lock plate 166, when the engagement surface 218 of the stopper 178 exits from the lower end surface of the protrusion 182, downward movement of the shift lock plate 166 can immediately be reed without it being necessary the stopper 178 to pivot again.

In the first preferred embodiment, the shift lock release portion 118 is formed integrally with the stopper 42. However, in the second preferred embodiment, a shift lock release lever 196 which serves as the shift lock release portion is provided at the bracket 170. The tip end portion of the upper guide pin 172 among the guide pins 172, 32 is extended so as to form an extended portion 198. The shift lock release lever 196 freely pivots around this extended portion 198. The extended portion 198 penetrates through the intermediate portion of the shift lock release lever 196. The tip end of the penetrating extended portion 198 engages with an E ring 211 via a washer 202.

Figure 14:
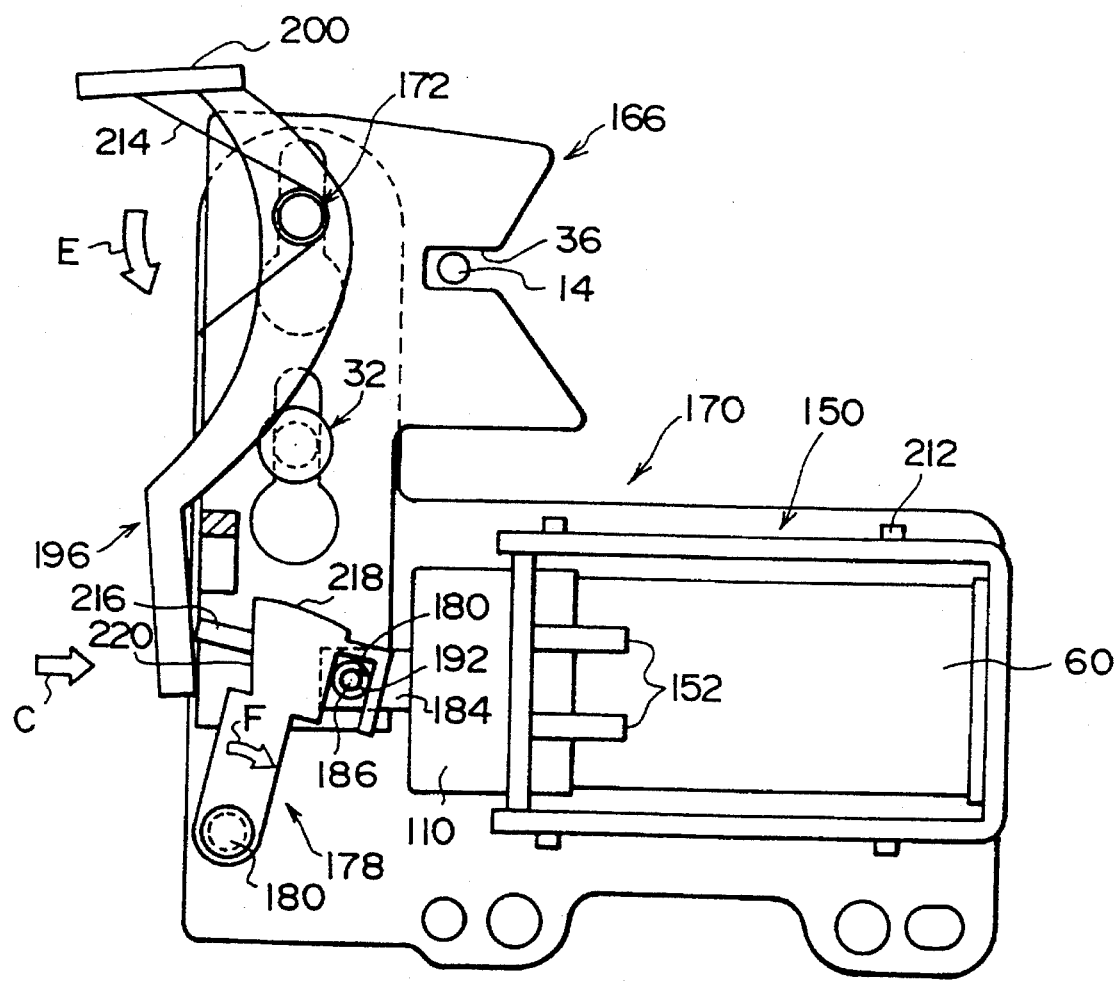
FIG. 14 is a front view illustrating a state in which the shift lock release lever is operated in FIG. 11.

A rectangular pushing portion 200 is formed at the upper end portion of the shift lock release lever 196. As illustrated in FIG. 14 when the pushing portion 200 is pushed downward by an unillustrated separate member, the shift lock release lever 196 pivots in the direction of arrow E around the extended portion 198 against the rotational urging force of a torsion coil spring 214. The lower end portion of the shift lock release lever 196 pushes an operation protrusion 216, which protrudes from the top end portion of the stopper 178, and pivots the stopper 178 in the direction of arrow F. (The plunger 184 is pulled in the direction of arrow C against the urging force of a spring within the solenoid.) The stopper 178 can thereby be separated from the shift lock plate 166. The torsion coil spring 214 (rotational urging means) Tits between the shift lock lever 196 of the extended portion 198 and the washer 202. One end of the torsion coil spring 214 engages with the shift lock release lever 196, whereas the other end engages with the side edge of the shift lock plate 166. A notch 183 is formed in the protrusion 182 of the shift lock plate 166. When the shift lock plate 166 moves downward, the operation protrusion 216 moves relatively within the notch 183, and interference between the protrusion 182 and the operation protrusion 216 is prevented.

In the first preferred embodiment, the extended plate 88 of the shift lock control switch 72 is held and mounted between the outer cover 122 and the supporting frame 62 of the solenoid 38. However, in the second preferred embodiment, at the shift lock control switch 154, nipping portions 204 bent at the upper and lower ends of the extended plate 156 (corresponding to the extended plate 88 of the first preferred embodiment) elastically nip an upper wall 208 and a lower wall 210 of a supporting frame 206 of the solenoid 150. In this nipped state, engagement concave portions 213 engage with engagement protrusions 212 formed between the respective nipping portions 204 and the upper wall 208 and the lower wall 210 of the supporting frame 206 of the solenoid 150. In this way, the shift lock control switch 154 is mounted to the solenoid 150 at a predetermined position (see FIG. 13).

In the second preferred embodiment, the movement of the shift lock plate 166 in the vertical direction is guided by the two (upper and lower) guide pins 172, 32, and the stopper 178 pivots and freely engages with and separates from the shift lock plate 166. Therefore, parts corresponding to the guide portions 104, 106 and the horizontal portion 116 of the first preferred embodiment are unnecessary.

Further, in the shift lock control switch 154, the contact holder 76 is accommodated in a switch cover 222 (which is the same as the switch cover 74 of the first preferred embodiment except that the guide portion 104 is eliminated). The switch cover 222 being closed by the circuit plate 78 is the same as in the first preferred embodiment.

A switch opposing portion 224 (corresponding to the switch opposing portion 80 of the first embodiment) is formed at the protrusion 182. An engagement hole 226 (corresponding to the engagement hole 82 of the first embodiment) which engages with the guide pin 84 of the contact holder 76 is formed such that the end thereof at the side opposite the solenoid 150 is open.

Other structures of the second embodiment are the same as those of the first embodiment.

In accordance with the structure of the second preferred embodiment, the power input connector pins 164 of the solenoid 150 and the signal output connector pins 96 of the shift lock control switch 154 are both disposed at the shift lock control switch 154. When the shift lock control switch 154 engages with the shift lock plate 166 and is mounted to the solenoid 150, the power input connector pins 164 and the terminal plates 152 formed at the power input terminals of the solenoid 150 are connected via the contactors 158. The power input connector pins 164 and the signal output connector pins 96 are fit into a single female-type connector. Wiring between the solenoid 150 as well as the shift lock control switch 154, and the shift lock controller is formed.

In this way, a single male-type connector suffices at the shift lock unit at the wiring between the solenoid 150 as well as the shift lock control switch 154, and the shift lock controller. (The male-type connector is formed by the connector tube and the power input connector pins 164 and the signal output connector pins 96.) The number of structural parts can be decreased accordingly, and the overall structure can be made compact.

In the first preferred embodiment, the shift lock control switch 72 can be positioned easily by positioning in a row the power input connector pins 98 and the signal output connector pins 96, which are to form the male-type connector, when the engagement pin 84 and the engagement hole 82 engage and the shift lock control switch 72 is mounted. However, in the second preferred embodiment, regardless of whether the shift lock control switch 154 is mounted to the solenoid 150, the power input connector pins 164 and the signal output connector pins 96 are positioned in a row to form the male-type connector. When the shift lock control switch 154 is mounted to the solenoid 150, due to the contactors 158 press-contacting the terminal plates 152 formed at the power input terminals of the solenoid 150, the need for excessive positional accuracy between the contactors 158 and the terminal plates 152 can be eliminated especially in the longitudinal direction of the terminal plates 152.

Further, in the second preferred embodiment, the shift lock plate is moved and guided in the vertical direction by the two guide pins 172, 32. Therefore, the same operation and effects as those of the first preferred embodiment are obtained except for those obtained by the structure in the first embodiment in which one guide pin 32 is provided and the shift lock plate 28 is urged to pivot around the guide pin 32 and abuts the guide protrusion 112 of the solenoid 110.

Figure 15:
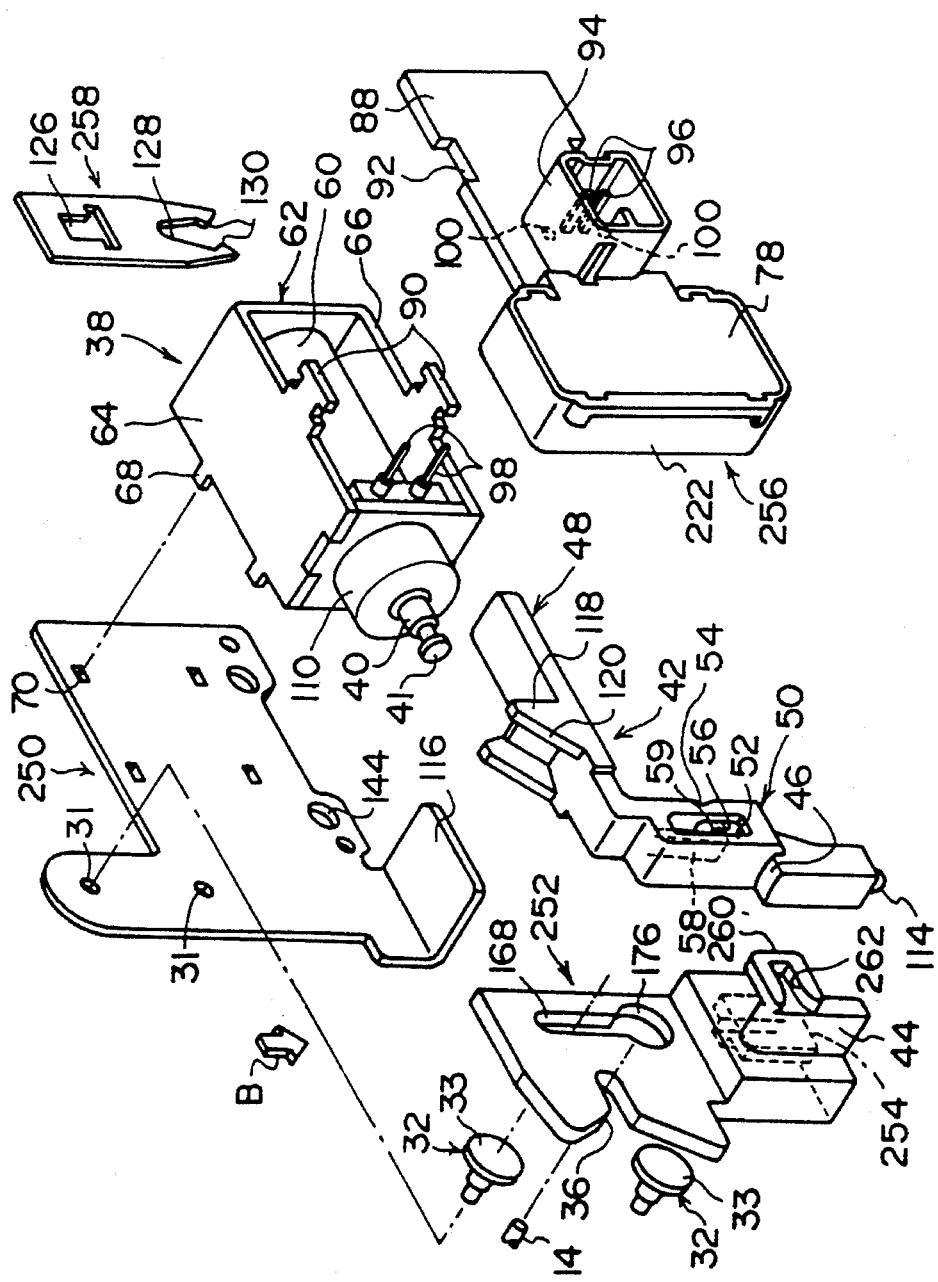
FIG. 15 is an exploded perspective view of a shift lock unit of a third embodiment.

Next, a third preferred embodiment will be described on the basis of FIG. 15.

In the second preferred embodiment, between the bracket 170 and the shift lock plate 166, the two (upper and lower) guide pins 172, 32 are fit with the guide holes 168. However, in the third preferred embodiment, between a bracket 250 and a shift lock plate 252, the lower guide pin 32 among the two (upper and lower) guide pins 32 is fit with a guide groove 254. In the same way as the guide groove 30 of the first preferred embodiment, the guide groove 254 is formed in a surface which opposes the bracket 250 so as to extend in the vertical direction. The guide groove 254 is provided at the lower end portion of the shift lock plate 252, and the bottom end of the groove is open. In a state in which the upper guide pin 32 penetrates through the large-diameter hole 176 communicating with the guide hole 168, the lower guide pin 32 is beneath the open lower end of the groove 254 at a position from which the lower groove pin 32 enters the guide groove 254. In this state, by moving the shift lock plate 252 upward, the upper guide pin 32 fits with the guide hole 168, and the lower guide pin 32 fits with the guide groove 254. By moving the upper guide pin 32 in the guide hole 168 and moving the lower guide pin 32 in the guide groove 254, movement of the shift lock plate 252 in the vertical direction can be guided.

In the first preferred embodiment, the shift lock plate 28 is supported at a single guide pin 32. The movement of the shift lock plate 28 in the vertical direction is guided by slidingly contacting the shift lock plate 28 with the guide protrusion 112 of the front surface of the solenoid head 110, and by moving the shift lock plate 28 in a direction perpendicular to the guide pin 32. Accordingly, the third embodiment differs from the first preferred embodiment in that, in the third embodiment (in the same way as in the second embodiment), the guide portions 104, 106 and the horizontal portion 116 of the first embodiment are not needed.

The shift lock plate 252 is the same as the shift lock plate of the first preferred embodiment with the exception that the shift lock plate 252 is moved and guided by two guide pins 32.

In a shift lock control switch 256, the contact holder 76 is accommodated within the switch cover 222 (which is the same as the switch cover 74 of the first embodiment except that there is no guide portion 104). The shift lock control switch 256 is closed by the circuit plate 78.

The mounting of the shift lock control switch 256 to the solenoid 38 is affected by a mounting tool 258 engaging with the mounting portions 90 of the upper wall 64 and the lower wall 66 of the supporting frame 62 of the solenoid 38. The mounting tool 258 is shaped similarly to the mounting portion 124 of the outer cover 122 of the first embodiment. The engagement of the mounting tool 258 and the supporting frame 62 such that the extended plate 88 of the shift lock control switch 256 is held between the supporting frame 62 of the solenoid 38 and the mounting tool 258 is the same as in the first preferred embodiment.

The stopper 42 being mounted to the plunger of the solenoid 38, and the stepped portion 46 of the stopper 42 being able to engage with and separate from the protrusion 44 of the shift lock plate 252 are the same as in the first preferred embodiment. Further, the engagement pin 84 of the shift lock control switch 256 engages an engagement hole 262 (corresponding to the engagement hole 82 of the first embodiment) of a switch opposing portion 260 (corresponding to the switch opposing portion 80 of the first embodiment) of the shift lock plate 252. In a state in which the shift lock control switch 256 is mounted to the solenoid 38, the power input connector pins 98 at the solenoid 38 project into the tube interior from the through holes 100 at the tube bottom of the connector tube 94 of the extended plate 88 of the shift lock control switch 256. The male-type connector being formed by the power input connector pins 98 and the signal output connector pins is the same as in the first embodiment.

In accordance with the above-described structure, the shift lock plate 252 is moved and guided in the vertical direction by the two guide pins 32. The same operation and effects as those of the first preferred embodiment are obtained except for those obtained by providing a single guide pin 32 in the first embodiment and urging the shift lock plate 28 to pivot around the guide pin 32 so as to abut the guide protrusion 112 of the solenoid head 110.

Figure 16:
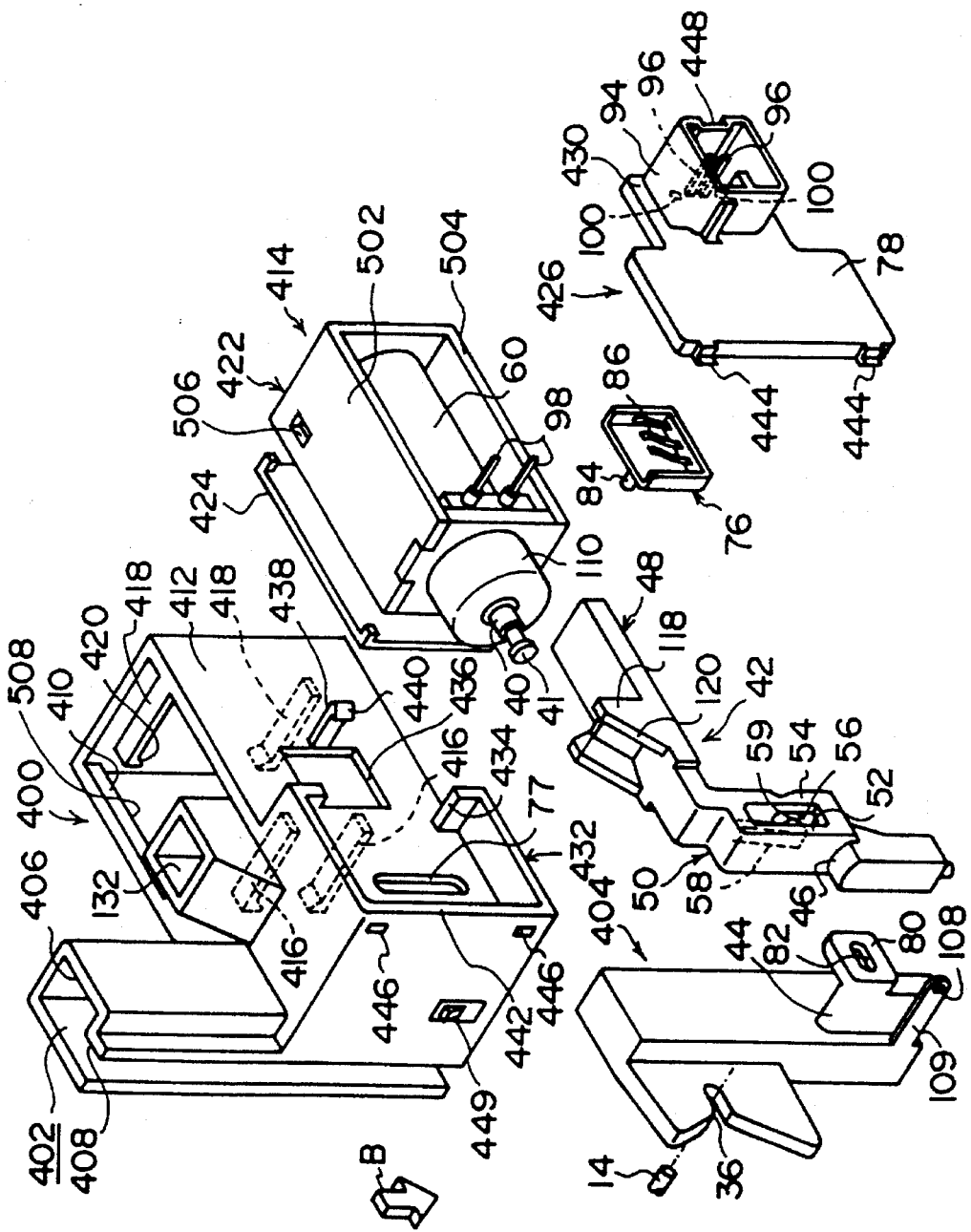
FIG. 16 ia an exploded perspective view of a shift lock unit of a fourth embodiment.
Figure 17:
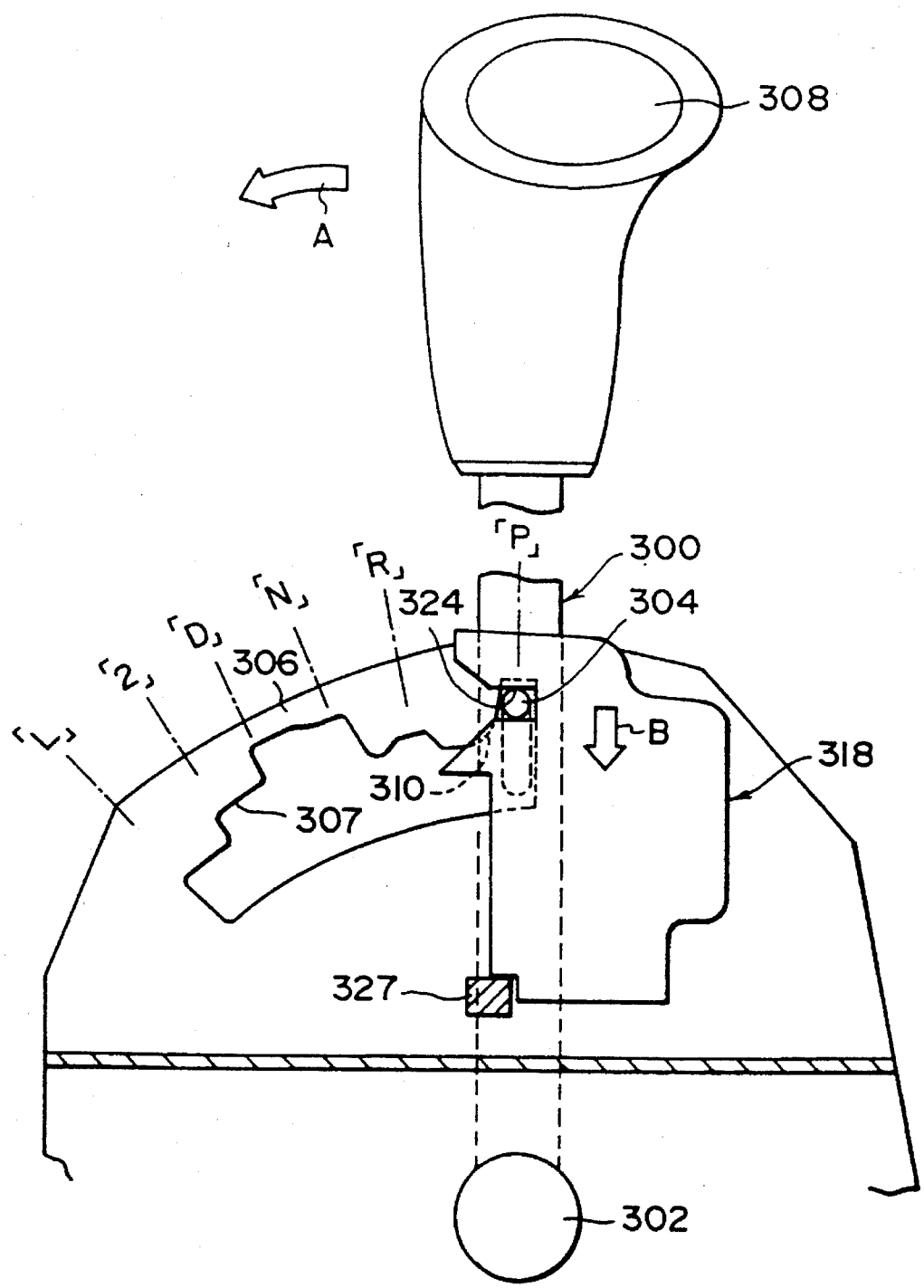
FIG. 17 is a front view of a shift lever device of an automatic transmission of an automobile, to which shift lever device a conventional shift lock unit is applied.
Figure 18:
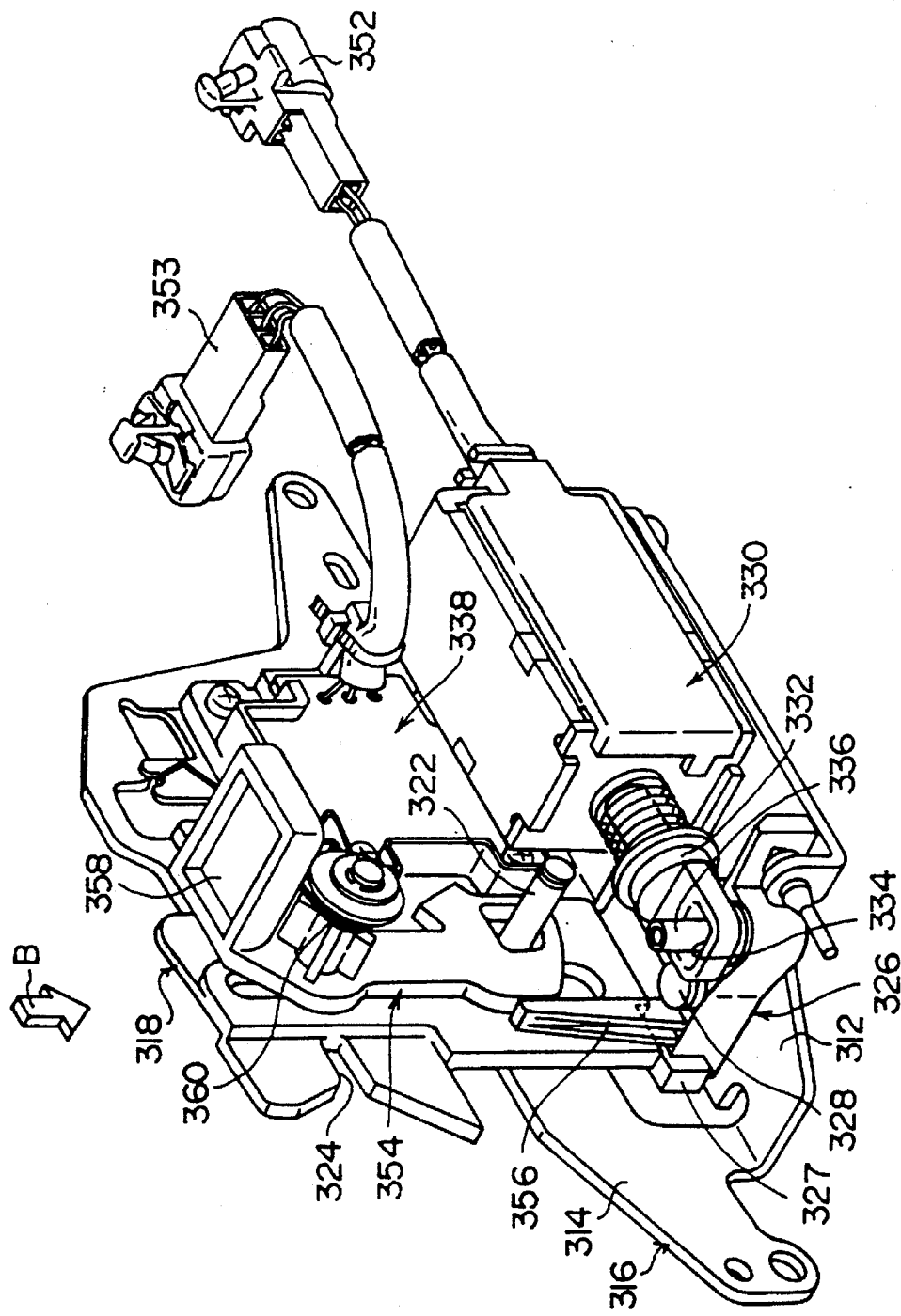
FIG. 18 is an assembled perspective view of a conventional shaft lock unit.
Figure 19:
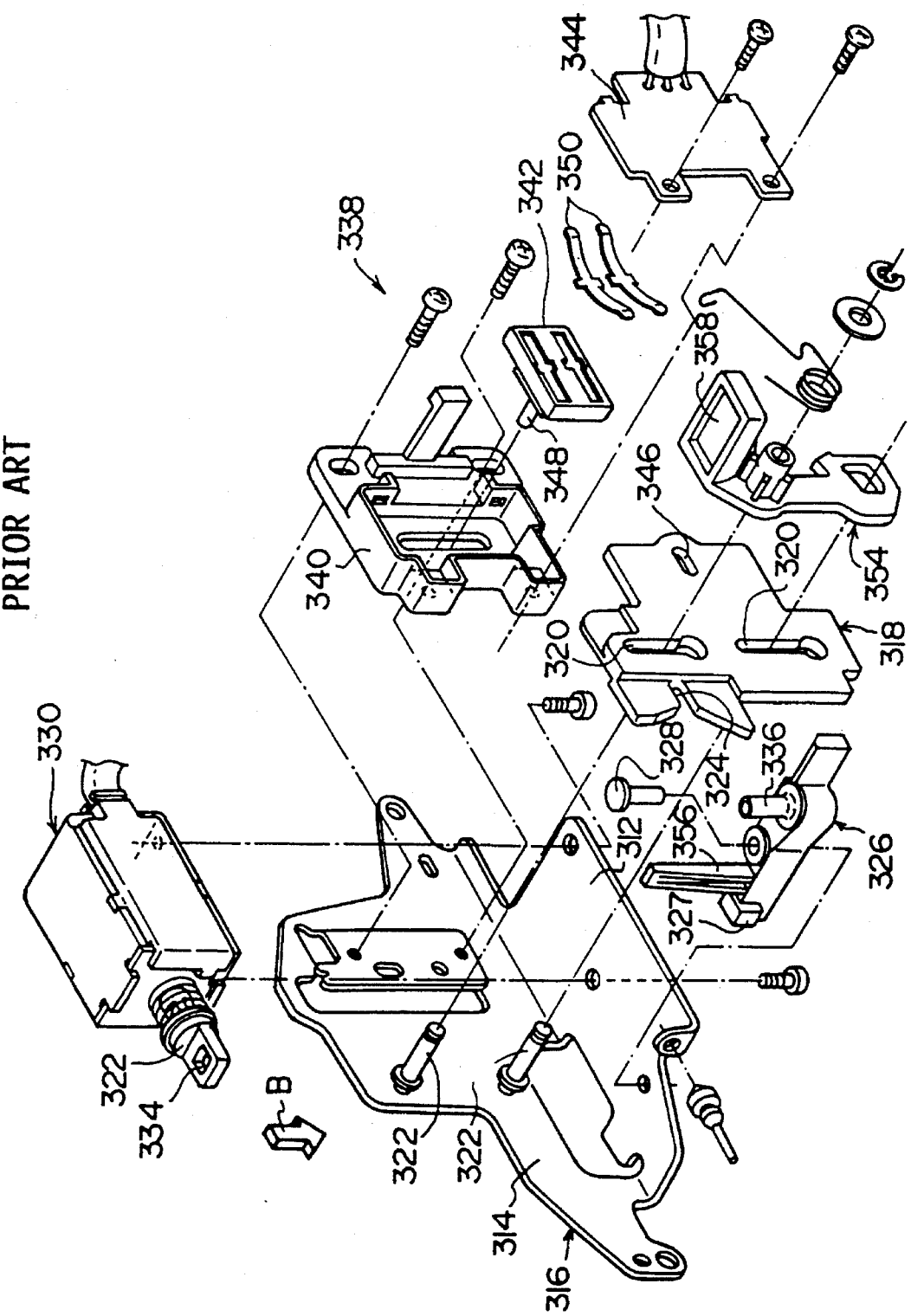
FIG. 19 is an exploded perspective view of a conventional shift lock unit.

Next, a fourth preferred embodiment of the shift lock unit will be described on the basis of FIG. 16.

Although the bracket 26 is plate-shaped in the first embodiment, in the fourth embodiment, a bracket 400 is box-shaped.

One end portion of the bracket 400 protrudes upward, and a guide groove 402 which extends in the vertical direction is formed at the interior portion of the protruding portion. A shift lock plate 404 is accommodated in the guide groove 402. A groove back portion 406 of the guide groove 402 is wide, and a groove mouth 408 is narrow. The engagement concave portion 36, which is thin and formed as a portion of the shift lock plate 404, protrudes to the exterior from the narrow groove mouth 408. The thick other portions of the shift lock plate 404 are moved and guided in the vertical direction by the wide groove back portion 406.

The shift lock plate 404 being provided with the protrusion 44 and the switch opposing portion 80 are the same as the shift lock plate 28 of the first embodiment. Further, a guide portion 109 having the same shape as the guide portion 106 of the first embodiment is formed at the bottom end portion of the shift lock plate 404 so as to be flexibly and elastically deformable in the same way. The guide portion 109 prevents the guide protrusion 108 from being urged to abut the inner surfaces of the walls of the bracket 400 and the shift lock plate 404 from clattering in the interior of the guide groove 402.

At the other end of the bracket 400, a solenoid 414 is mounted to the inner surface of a second vertical wall 412 of a pair of opposing vertical walls (a first vertical wall 410 and the second vertical wall 412). A pair of arm portions 416, 418 is provided at the top end of the second vertical wall 412 and at the bottom end of the second vertical wall 412, respectively, and protrude toward the first vertical wall 410. Pawls 420 at the tip ends of the arm portions 418 elastically engage, at top and bottom, concave portions 506 formed in a top wall 502 and a bottom wall 504 of a supporting frame 422 of the solenoid 414, so as to nip the solenoid end. The other arm portions 416 nip the solenoid head 110, so that the solenoid 414 is mounted at a predetermined position.

A protection plate 424 covers the surface of the solenoid coil 60 opposing the first vertical wall 410 in order to protect winding terminal connecting portions. The protection plate 424 is installed by being elastically engaged with the supporting frame 422.

The stopper 42 is mounted to the plunger 40 of the solenoid 414, and the stopper 42 moves so as freely engage with and separate from the protrusion 44 of the shift lock plate 404. In the engaged state, the shift lock plate 404 cannot move downward, and movement of the shift lock plate 404 downward in the axial direction of the shift lever is prevented. In the separated state, the shift lock plate 404 can move downward, and movement thereof downward in the axial direction of the shift lever is permitted. In this respect, the fourth preferred embodiment is similar to the first preferred embodiment.

A shift control switch 426 is mounted to the outer surface of the second vertical wall 412 from one end portion of the bracket 400 to the central portion thereof. The shift control switch 426 is provided with the contact holder 76 and the circuit plate 78. A connector portion 430 is formed integrally with the circuit plate 78. At one end portion of the bracket 400, the circuit plate 78 is positioned within a frame 432 which is shaped as a rectangular frame and protrudes from the outer surface of the second vertical wall 412. An intermediate portion of a vertical side portion of the frame 432 is missing, and the connector portion 430 extends from the missing portion 434 so as to reach the central portion of the second vertical wall 412.

An elongated hole 77, whose longitudinal direction is the vertical direction, is formed in the second vertical wall 412 at the interior of the frame 432. The contact holder 76 is interposed between the second vertical wall 412 and the circuit plate 78 at the interior of the frame 432. The engagement pin 84 of the contact holder 76 penetrates through the elongated hole 77 and engages with the engagement hole 82 of the switch opposing portion 80 of the shift lock plate 404. The moving contacts 86 of the contact holder 76 can contact the fixed contacts 79 of the circuit plate 78. By moving the shift lock plate 404 in the vertical direction, the contact holder 76 moves. The moving contacts 86 thereby contact different fixed contacts 79, and the P position at the upper position of the shift lock plate 404 can be detected. This structure is the same as the first embodiment.

The contact portion 430 is provided with the connector tube 94. In the same way as in the first embodiment, the signal output connector pins 96 project into the interior of the connector tube 94 from the tube bottom in the direction of thickness thereof, and the through holes 100 are formed in the tube bottom.

A rectangular hole 436 is formed in the second vertical wall 412 so as to oppose the tube bottom of the connector tube 94. When the shift lock control switch 426 is mounted, the power input connector pins 98 of the solenoid 414 penetrate through the through holes 100 of the tube bottom of the connector tube 94 from the rectangular hole 436, and project into the interior of the connector tube 94. The signal output connector pins 96 and the power input connector pins 98 thereby form the male-type connector. This point is the same as the first preferred embodiment.

An arm portion 438 projects from the outer surface of the second vertical wall 412 at the edge of the rectangular hole 436. A pawl 440 is provided at the tip end of the arm portion 438. Convex portions 444 are formed at a side edge of the circuit plate 78. Concave portions 446 are formed at a vertical side portion 442 of the frame 432 which corresponds to the side edge of the circuit plate 78. The pawl 440 of the arm portion 438 elastically engages a concave portion 448 at the tip end of the connector tube 94 and the convex portions 444 and the concave portions 446 engage elastically, so that the shift lock control switch 426 is mounted at a predetermined position.

The opening 132, which opposes the inclined portions 120 of the shift lock release portion 118 formed at the stopper 42, is formed at the upper portion of the bracket 400. The inclined portions 120 can be pushed from the opening 132 by using another member. In this way, the stopper 42 can be moved to the state of being separated from the shift lock plate 404. This point is the same as the first embodiment.

An engagement convex portion 449 for mounting to a shift lever device is formed at the side wall of the bracket 400. The engagement convex portion 449 can elastically snap-fit.

The groove mouth 408 is formed continuously in the bracket 400 from the top to the bottom thereof. The shift lock plate 404 can be inserted into and mounted to the guide groove 402 from the bottom of the bracket 400, specifically, from the opening formed in the bottom surface of the bracket 400 and corresponding to the guide groove 402. A mounting opening 508 is formed in the first vertical wall 410 so as to correspond to the solenoid 414. The solenoid 414 can be inserted into and mounted to the interior of the bracket 400 from the mounting opening 508.

In accordance with the above-described structure the bracket 400 is box-shaped, and the shift lock plate guiding portion and the stopper driving means mounting portion are provided at the interior of the bracket 400. The detecting switch mounting portion is provided at the exterior of the bracket 400. These structures are formed integrally by synthetic resin.

Accordingly the shift lock unit can be made compact as compared with a conventional structure which becomes large due to the management of materials for press-working a bracket which is metal.

The guide portion of the shift lock plate is urged to abut the inner surface of the wall of the bracket. Movement of the shift lock plate in a direction perpendicular to the vertical direction is prevented, and clattering is prevented.

In the first embodiment, the shift lock control switch 72 is provided with the switch cover 74. In contrast, at the shift lock control switch 426, the second vertical wall 412 of the bracket 400 is used in place of the switch cover 74. The number of structural parts is thereby decreased correspondingly.

The shift lock plate 404 is moved and guided by the guide groove 402. Therefore, the operation and effects are the same as those of the first embodiment with the exception that a single guide pin 32 is provided in the first embodiment, and that the shift lock plate 28 is urged to pivot around the guide pin 32 and abuts the guide protrusion 112 of the solenoid head 110.

The present invention is not limited to the above-described embodiments, and a variety of modifications are possible.

For example, to form the male-type connector, in the first preferred embodiment and the fourth preferred embodiment, the power input connector pins are provided at the solenoid and the signal output connector pins are provided at the shift lock control switch. When the shift lock control switch is mounted, the power input connector pins and the signal output connector pins are positioned in a row (way A). In order to form the male-type connector in the second preferred embodiment and the third preferred embodiment, the power input connector pins and the signal output connector pins are provided at the shift lock control switch. When the shift lock control switch is mounted, the contactors contact the terminal plates of the power input terminals of the solenoid (way B). In the first and fourth preferred embodiments, way B may be used in place of way A, whereas in the second and third preferred embodiments, way A may be used in place of way B.

For the stopper to freely engage with and separate from the shift lock plate, in the first, third and fourth preferred embodiments, the stopper is mounted to the plunger of the solenoid and is moved and driven in the axial direction of the plunger (way C). In the second embodiment, the stopper is mounted to the bracket so as to pivot freely, and the bracket is pivoted by the plunger of the solenoid (way D). Way D may be used in place of way C in the first, third and fourth preferred embodiments, whereas way C may be used in place of way D in the second preferred embodiment.

The stopper driving means is not limited to a solenoid, and other means may be used. The detecting switch is not limited to the shift lock control switch of the above-described embodiments. The detecting switch may engage with the shift lock plate, and the P position may be detected by the position of movement of the shift lock plate.

When the solenoid is operated, the stopper separates from the shift lock plate. A structure may be provided in which, conversely, the stopper and the shift lock plate come into the engaged state when the solenoid is operated. When the shift lever is in the P position and the brake pedal is depressed, the operation of the solenoid is stopped.

In the above-described embodiments, the guide pins 32, 172 are provided at the brackets 26, 170, 250, whereas the guide grooves 30, 254 and the guide hole 168 are provided at the shift lock plates 28, 166, 252. Conversely, the guide pins may be provided at the shift lock plates, and the guide hole and guide grooves may be provided at the brackets.

What is claimed is:

1. A shift lock unit comprising:

a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation;

a stopper moving in a direction intersecting a direction of movement of said shift lock plate, such that said stopper freely engages with and separates from said shift lock plate, and in an engaged state of said stopper and said shift lock plate, movement of said shift lock plate due to movement of the grooved pin in the axial direction of the shift lever is not possible and movement of the grooved pin in the axial direction of the shift lever is prevented, and in a separated state of said stopper and said shift lock plate, movement of said shift lock plate is due to movement of the grooved pin in the axial direction of the shift lever is possible and movement of the grooved pin in the axial direction of the shift lever is permitted;

stopper driving means for driving said stopper;

a detecting switch engaging with said shift lock plate and detecting whether the shift lever is in the P position on the basis of a position of movement of said shift lock plate;

power input connector pins formed at power input terminals of said stopper driving means; and signal output connector pins formed at signal output terminals of said detecting switch, and said detecting switch and said shift lock plate engage, and said signal output connector pins are positioned in a row with said power input connector pins, and said signal output connector pins together with said power input connector pins are fit with a single female-type connector at wiring between said stopper driving means as well as said detecting switch, and a shift lock controller which controls said stopper driving means to prevent shifting of the P position to another position when a brake pedal is not depressed.

2. A shift lock unit comprising:

a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation;

a stopper moving in a direction intersecting a direction of movement of said shift lock plate, such that said stopper freely engages with and separates from said shift lock plate, and in an engaged state of staid stopper and said shift lock plate, movement of said shift lock plate due to movement of the grooved pin in the axial direction of the shift lever is not possible and movement of the grooved pin in the axial direction of the shift lever is prevented, and in a separated state of said stopper and said shift lock plate, movement of said shift lock plate due to movement of the grooved pin in the axial direction of the shift lever is possible and movement of the grooved pin in the axial direction of the shift lever is permitted;

stopper driving means for driving said stopper;

a detecting switch engaging with said shift lock plate and detecting whether the shift lever is in the P position on the basis of a position of movement of said shift lock plate;

signal output connector pins provided at said detecting switch and formed at signal output terminals of said detecting switch; and power input connector pins provided at said detecting switch, and in a state in which said detecting switch and said shift lock plate are engaged, said power input connector pins being electrically connected to power input terminals of said stopper driving means via a contacting means, and said power input connector pins together with said signal output connector pins being fit with a single female-type connector at wiring between said detecting switch as well as said stopper driving means, and a shift lock controller which controls said stopper driving means to prevent shifting from the P position to another position when a brake pedal is not depressed.

3. A shift lock unit comprising:

a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation;

a stopper moving in a direction intersecting a direction of movement of said shift lock plate, such that said stopper freely engages with and separates from said shift lock plate, and in an engaged state of said stopper and said shift lock plate, movement of said shift lock plate due to movement of the grooved pin in the axial direction of the shift lever is not possible and movement of the grooved pin in the axial direction of the shift lever is prevented, and in a separated state of said stopper and said shift lock plate, movement of said shift lock plate due to movement of the grooved pin in the axial direction of the shift lever is possible and movement of the grooved pin in the axial direction of the shift lever is permitted;

stopper driving means having a moved/driven shaft which is moved and driven in an axial direction, said stopper being mounted to the moved/driven shaft;

a detecting switch engaging with said shift lock plate, and detecting whether the shift lever is in the P position on the basis of a position of movement of said shift lock plate, and operating said stopper driving means to prevent shifting from the P position to another position when a brake pedal is not depressed; and guiding means having a guiding pin and allowing said shift lock plate to freely move in a direction perpendicular to the guide pin and to freely pivot around the guide pin in a direction of movement of said stopper, said guiding means having an urging means for urging said shift lock plate to pivot around the guide pin to abut a fixed portion of said stopper driving means, said guiding means moving and guiding in a direction perpendicular to the guide pin said shift lock plate, which moves due to movement of the grooved pin in the axial direction of the shift lever, while making said shift lock plate slidingly contact with the fixed portion of said stopper driving means.

4. A shift lock unit according to claim 1, wherein said shift lock unit is provided with a bracket formed in a box-shape and having:

a shift lock plate guiding portion provided at an interior portion of said bracket and moving and guiding said shift lock plate which moves due to movement of the grooved pin;

a stopper driving means mounting portion provided at an exterior portion of said bracket and mounting said stopper driving means;

a detecting switch mounting portion provided at an exterior portion of said bracket and mounting said detecting switch, said shift lock plate guiding portion, said stopper driving means mounting portion, and said detecting switch mounting portion being formed integrally with said bracket from synthetic resin.

5. A shift lock unit according to claim 4, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

6. A shift lock unit comprising:

a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation;

a stopper moving in a direction intersecting a direction of movement of said shift lock plate, such that said stopper freely engages with and separates from said shift lock plate, and in an engaged state of said stopper and said shift lock plate, movement of said shift lock plate due to movement of the grooved pin in the axial direction of the shift lever is not possible and movement of the grooved pin in the axial direction of the shift lever is prevented, and in a separated state of said stopper and said shift lock plate, movement of said shift lock plate due to movement of the grooved pin in the axial direction of the shift lever is possible and movement of the grooved pin in the axial direction of the shift lever is permitted;

stopper driving means having a moved/driven shaft which is moved and driven in an axial direction, said stopper being mounted to the moved/driven shaft;

a detecting switch engaging with said shift lock plate, and detecting whether the shift lever is in the P position on the basis of a position of movement of said shift lock plate, and controlling said stopper driving means to prevent shifting from the P position to another position when a brake pedal is not depressed; and an elastically deforming portion provided between said stopper and the moved/driven shaft, said elastically deforming portion applying urging force in a direction of making said stopper follow movement of said moved/driven shaft.

7. A shift lock unit comprising:

a shift lock plate moving due to movement of a grooved pin in an axial direction of a shift lever and engaging with the grooved pin, the movement of the grooved pin in the axial direction of the shift lever being required in order to shift from a P position to another position when shifting in an automatic transmission in which an engagement position of the grooved pin and a detent plate is changed by shift lever operation;

a stopper moving in a direction intersecting a direction of movement of said shift lock plate, such that said stopper freely engages with and separates from said shift lock plate, and in an engaged state of staid stopper and said shift lock plate, movement of said shift lock plate due to movement of the grooved pin in the axial direction of the shift lever is not possible and movement of the grooved pin in the axial direction of the shift lever is prevented, and in a separated state of said stopper and said shift lock plate, movement of said shift lock plate due to movement of the grooved pin in the axial direction of the shift lever is possible and movement of the grooved pin in the axial direction of the shift lever is permitted;

stopper driving means having a moved/driven shaft which is moved and driven in an axial direction, said stopper being mounted to the moved/driven shaft;

a detecting switch engaging with said shift lock plate, and detecting whether the shift lever is in the P position on the basis of a position of movement of said shift lock plate, and controlling said stopper driving means to prevent shifting from the P position to another position when a brake pedal is not depressed; and a shift lock release portion formed integrally with said stopper, and when said shift lock release portion is pressed in a direction intersecting a direction of movement of said stopper, said stopper is moved in a direction of separating from said shift lock plate.

8. A shift lock unit according to claim 1, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

9. A shift lock unit according to claim 2, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

10. A shift lock unit according to claim 3, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

11. A shift lock unit according to claim 2, wherein said shift lock unit is provided with a bracket formed in a box-shape and having:

a shift lock plate guiding portion provided at an interior portion of said bracket and moving and guiding said shift lock plate which moves due to movement of the grooved pin;

a stopper driving means mounting portion provided at an exterior portion of said bracket and mounting said stopper driving means;

a detecting switch mounting portion provided at an exterior portion of said bracket and mounting said detecting switch, said shift lock plate guiding portion, said stopper driving means mounting portion, and said detecting switch mounting portion being formed integrally with said bracket from synthetic resin.

12. A shift lock unit according to claim 11 wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

13. A shift lock unit according to claim 6, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

14. A shift lock unit according to claim 7, wherein said stopper driving means is a solenoid, and said detecting switch has fixed contacts, an engagement portion which engages with said shift lock plate and moves together with said shift lock plate, and moving contacts which can contact said fixed contacts and move together with the engagement portion.

\* \* \* \* \*